United States Patent
Chen

(10) Patent No.: US 10,270,648 B2
(45) Date of Patent: Apr. 23, 2019

(54) CONFIGURATION INFORMATION MANAGEMENT METHOD, DEVICE, NETWORK ELEMENT MANAGEMENT SYSTEM AND STORAGE MEDIUM

(71) Applicant: ZTE CORPORATION, Shenzhen (CN)

(72) Inventor: Liping Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 278 days.

(21) Appl. No.: 15/323,242

(22) PCT Filed: Nov. 13, 2014

(86) PCT No.: PCT/CN2014/091039
§ 371 (c)(1),
(2) Date: May 8, 2017

(87) PCT Pub. No.: WO2016/000382
PCT Pub. Date: Jan. 7, 2016

(65) Prior Publication Data
US 2017/0244596 A1   Aug. 24, 2017

(30) Foreign Application Priority Data
Jun. 30, 2014 (CN) .......................... 2014 1 0309453

(51) Int. Cl.
*G06F 15/16* (2006.01)
*H04L 12/24* (2006.01)
(Continued)

(52) U.S. Cl.
CPC ...... *H04L 41/0803* (2013.01); *G06F 9/45558* (2013.01); *G06F 21/62* (2013.01);
(Continued)

(58) Field of Classification Search
CPC ....... G06F 9/45558; G06F 2009/45562; G06F 2009/4557
See application file for complete search history.

(56) References Cited

U.S. PATENT DOCUMENTS

| 8,775,589 B2 | 7/2014 | Liss et al. | |
| 2014/0201374 A1* | 7/2014 | Ashwood-Smith | ..... H04L 49/70 709/226 |
| 2015/0082308 A1* | 3/2015 | Kiess | .................... G06F 9/5072 718/1 |

FOREIGN PATENT DOCUMENTS

| CN | 101355454 | 1/2009 |
| CN | 101453730 | 6/2009 |

(Continued)

OTHER PUBLICATIONS

Extend European Search Report for EP 14896482.8, completed by the European Patent Office dated Apr. 7, 2017 All together 6 Pages.
(Continued)

*Primary Examiner* — Hieu T Hoang
(74) *Attorney, Agent, or Firm* — Plumsea Law Group, LLC

(57) ABSTRACT

A method for managing configuration information is disclosed including: an operation support system (OSS)/network management system/(NMS) receiving a lifecycle operation completion message of a virtualized network function (VNF); and sending a management information object instance operation request message corresponding to a lifecycle operation of the VNF to an element management system (EMS) according to the received lifecycle operation completion message of the VNF. A method and device for managing configuration information, an element management system (EMS) and a storage medium are also disclosed.

20 Claims, 21 Drawing Sheets

(51) Int. Cl.
  *H04W 4/60* (2018.01)
  *G06F 9/455* (2018.01)
  *H04W 88/18* (2009.01)
  *H04L 29/06* (2006.01)
  *G06F 21/62* (2013.01)

(52) U.S. Cl.
  CPC ........... *H04L 63/0272* (2013.01); *H04W 4/60* (2018.02); *H04W 88/18* (2013.01); *G06F 2009/4557* (2013.01); *G06F 2009/45562* (2013.01)

(56) References Cited

FOREIGN PATENT DOCUMENTS

| CN | 101627379 | 1/2010 |
| CN | 101938369 | 1/2011 |
| CN | 103607349 | 2/2014 |

OTHER PUBLICATIONS

3GPP, GS NFV-MAN 001 VO.5.O (May 2014), 193 Pages, "Network Function Virtualization (NFV) Management and Orchestration".

ETSI V. ISG-NFV, Apr. 30, 2014, 43 Pages, "Administrative Domains".

Draft ETSI GS NFV-SWA 001 V0.2.0 (May 2014), 94 Pages, "Network Functions Virtualization (NFV) Virtual Network Function Architecture".

Hu et al., NFVSWA(14)000060, Feb. 19, 2014, 62 Pages.

Office Action dated Apr. 10, 2018 for Japanese Patent Application No. 2016-575876.

"Network Functions Virtualisation (NFV); Architectura Framework", ETSI GS NFV 002, [online], ETSI, 201; V1.1.1, pp. 1-21.

"CUG Management Model and Management Interface Using Web Service", Information Processing Society of Japan, vol. 2006, No. 42, p. 55-60.

International Search Report for PCT/CN2014/091039, English Translation attached to original, Both completed by the Chinese Patent Office dated Mar. 9, 2015, All together 5 Pages.

* cited by examiner

CONFIGURATION INFORMATION MANAGEMENT METHOD, DEVICE, NETWORK ELEMENT MANAGEMENT SYSTEM AND STORAGE MEDIUM

CROSS-REFERENCE TO RELATED APPLICATION

This application is the U.S. national phase of PCT Application No. PCT/CN2014/091039 filed Nov. 13, 2014, which claims priority to Chinese Application No. 201410309453.2 filed Jun. 30, 2014, the disclosures of which are incorporated in their entirety by reference herein.

TECHNICAL FIELD

The present document relates to a mobile communication network management technology, and more particularly to a method and device for managing configuration information, an element management system (EMS) and a storage medium.

BACKGROUND

In the prior art, network functions are all implemented by network devices specific to or specifically designed by manufacturers, and there is an ultrastrong coupling relationship between the network and the network devices, which brings great inconvenience in practical applications. On the one hand, when performance of the network devices is improved, it is required that performance of carrier-grade reliability hardware of the network devices be improved while specific or customized requirements of the network functions are met, or newly designed network devices with dedicated functions be pre-deployed while new services are deployed by operators, which will obviously increase service deployment cost of the operators. On the other hand, with the rapid improvement of performance of central processing units (CPU) and memories, a basic condition for running of the network functions in the form of software on universal servers is provided, and a network function virtualization (NFV) technology emerges as the times require. A main function of the NFV is to run the network functions on the universal servers to implement large-scale service deployment, such that capital expenditure (CAPEX) can be reduced and at the same time the network functions can be deployed and updated according to requirements, thereby facilitating remote management and maintenance and reducing operating expense (OPEX).

After introduction of the NFV technology, the network functions of the network devices will be implemented on virtualized network functions (VNF), which may be regarded as application layers of the VNFs. Each VNF may implement different network functions according to specific configuration information. After introduction of the NFV, the management architecture of the existing network also changes a lot. A schematic diagram of an architecture and reference point for network function virtualization management and orchestration (NFV-MANO) is as shown in FIG. 1, herein a network functions virtualization orchestrator (NFVO) is responsible for functions such as lifecycle management of network services, network functions virtualization infrastructure (NFVI) resource scheduling of a cross-virtualized infrastructure manager (VIM), etc., and a virtualized network functions manager (VNFM) is responsible for lifecycle management of the VNFs. Each VNF instance is supposed to have an associated VNFM, and the virtualized infrastructure manager (VIM) is responsible for controlling and managing computing, storage and network resources of the NFVI. According to ETSI GS NFV-MANO 001, application layer configuration of the VNF instance may be included in a VNF package, and the VNFM may acquire configuration information from the VNF package and send it the VNF, or may also transmit it from an EMS to the VNF in a traditional manner. The requirements implemented through the traditional manner come from the case where hybrid networking of virtualized network devices and physical network devices will occur in a process of gradual virtualization of the network devices. At this point, application layer configuration information of the virtualized network devices is required to be able to be managed by the traditional network management architecture to facilitate unified operation and maintenance.

The traditional network management structure is usually a three-layer management structure including a network management system (NMS)/operation support system (OSS), an EMS and network devices, herein an interface between the NMS and the EMS is a northbound interface, and an interface between the EMS and the network devices is a southbound interface. The network management system will model each type of the network devices as a management information object class on the northbound interface, each of the network devices will have an information object instance of an object class which it belongs to, represented by a distinguish name (DN), and the information object instance contains configuration information of its corresponding network device. The management system completes management of the configuration information of the network devices by creation, deletion and updating operations of the information object instances, and the network devices, as management entities, will not change dynamically.

After the network devices are virtualized, the network functions are implemented on the VNFs, and the configuration information of the network functions is also valid only within the lifecycle of the VNFs. Lifecycle management of the VNFs includes Instantiate VNF, Terminate VNF, Scale VNF and Update VNF, etc. If the traditional network management systems are used to perform configuration management on the network functions provided by the VNFs, the configuration management of the network functions is required to be associated with the lifecycle management of the VNFs. However, configuration management functions of the traditional network management systems can not meet configuration management requirements of the network functions provided by the VNFs.

SUMMARY

In view of this, embodiments of the present document provide a method and device for managing configuration information, an element management system (EMS) and a storage medium, so as to enable an existing network management system to manage timely and effectively application layer configuration information of a VNF instance.

Technical schemes of the embodiments of the present document are implemented as follows.

An embodiment of the present document provides a method for managing configuration information, which includes: an operation support system/network management system (OSS/NMS) receiving a lifecycle operation completion message of a virtualized network function (VNF); and sending a management information object instance operation request message corresponding to a lifecycle operation of the VNF to an element management system (EMS) according to the received lifecycle operation completion message of the VNF.

An embodiment of the present document further provides another method for managing configuration information, which includes: an element management system (EMS) receiving a lifecycle operation completion message of a virtualized network function (VNF) or a management information object instance operation request message; and operating a management information object instance according to the received message, and operating a mapping relationship between the management information object instance and a VNF instance.

An embodiment of the present document further provides a device for managing configuration information, which includes a first receiving module and a first sending module, herein the first receiving module is arranged to receive a lifecycle operation completion message of a virtualized network function (VNF); and the first sending module is arranged to send a management information object instance operation request message corresponding to a lifecycle operation of the VNF to an element management system (EMS) according to the received lifecycle operation completion message of the VNF.

An embodiment of the present document further provides an element management system (EMS), which includes a second receiving module and a processing module, herein the second receiving module is arranged to receive a lifecycle operation completion message of a virtualized network function (VNF) or a management information object instance operation request message; and the processing module is arranged to operate a management information object instance according to the message received by the second receiving module, and operate a mapping relationship between the management information object instance and a VNF instance.

An embodiment of the present document further provides a computer storage medium having stored computer executable instructions therein, which are used to execute the abovementioned methods for managing the configuration information according to the embodiments of the present document.

In the method and device for managing configuration information, the EMS and storage medium provided by the embodiments of the present document, an OSS/NMS receives a lifecycle operation completion message of a VNF, and sends a management information object instance operation request message corresponding to a lifecycle operation of the VNF to an EMS according to the received lifecycle operation completion message of the VNF; the EMS receives the lifecycle operation completion message of the VNF or the management information object instance operation request message, and operates a management information object instance according to the received message, and operates a mapping relationship between the management information object instance and a VNF instance. Thus, during hybrid networking of virtual network devices and physical network devices, each VNF instance has its corresponding management information object instance, such that the existing network management system can manage timely and effectively application layer configuration information of the VNF instance.

PREFERRED EMBODIMENTS OF THE PRESENT DOCUMENT

In embodiments of the present document, an OSS/NMS receives a lifecycle operation completion message of a VNF, and sends a management information object instance operation request message corresponding to a lifecycle operation of the VNF to an element management system (EMS) according to the received lifecycle operation completion message of the VNF; the EMS receives the lifecycle operation completion message of the VNF or the management information object instance operation request message, and operates a management information object instance according to the received message, and operates a mapping relationship between the management information object instance and a VNF instance.

Management of the configuration information in the embodiments of the present document refers to operations such as creation, deletion, updating, query and the like and their corresponding processing processes.

Figure 1:
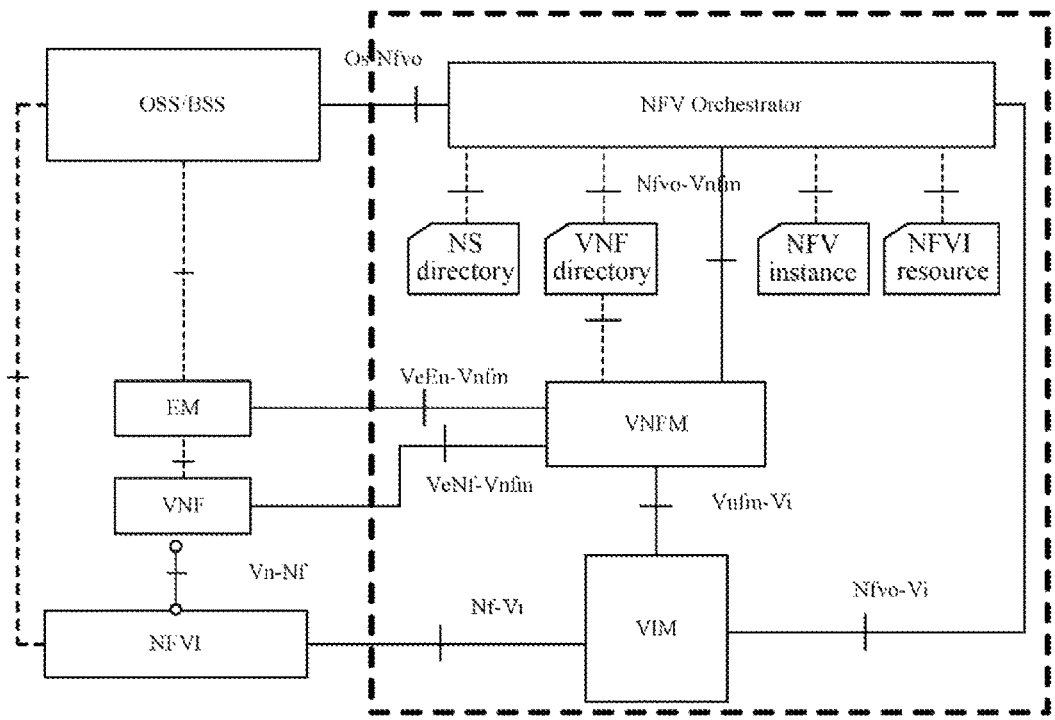
FIG. 1 is a schematic diagram of an architecture and reference point for NFV-MANO.
Figure 2:
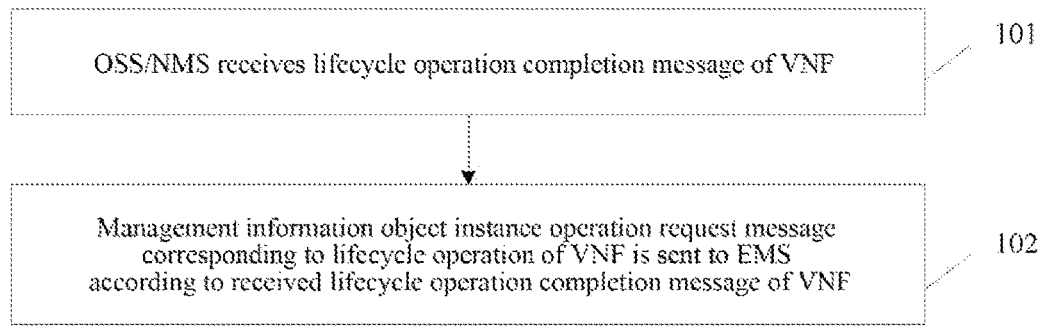
FIG. 2 is a basic processing flowchart of a method for managing configuration information at an OSS/NMS side according to an embodiment of the present document.

A basic processing flow of a method for managing configuration information at an OSS/NMS side according to an embodiment of the present document, as shown in FIG. 2, includes the following steps:

Step 101: an OSS/NMS receiving a lifecycle operation completion message of a VNF, herein the lifecycle operation completion message of the VNF includes a confirmation message, sent by an NFVO, for Instantiate VNF completion;

or a notification message, sent by an EMS, for Instantiate VNF completion, the notification message including an identity (ID) of a VNF instance and a VNF instance type;

or a confirmation message, sent by the NFVO, for Terminate VNF completion;

or a confirmation message, sent by the NFVO, for VNF instance alteration completion;

or a notification message, sent by the EMS, for VNF instance alteration completion, the notification message including the ID of the VNF instance and a VNF instance alteration operation type; and Step 102: sending a management information object instance operation request message corresponding to a lifecycle operation of the VNF to the EMS according to the received lifecycle operation completion message of the VNF.

A parameter carried in the request message includes a distinguish name (DN) of a management information object instance corresponding to the VNF instance.

Specifically, when the lifecycle operation completion message of the VNF is the confirmation message, sent by the NFVO, for Instantiate VNF completion, sending the management information object instance operation request message corresponding to the lifecycle operation of the VNF to the EMS according to the received lifecycle operation completion message of the VNF includes:

the OSS/NMS sending a request message for creation of the management information object instance corresponding to the VNF instance to the EMS, herein a parameter carried in the request message includes the DN of the management information object instance corresponding to the VNF instance and the ID of the VNF instance.

When the lifecycle operation completion message of the VNF is the notification message, sent by the EMS, for Instantiate VNF completion, sending the management information object instance operation request message corresponding to the lifecycle operation of the VNF to the EMS according to the received lifecycle operation completion message of the VNF includes:

the OSS/NMS sending a request message for creation of the management information object instance corresponding to the VNF instance to the EMS, herein a parameter carried in the request message includes the DN of the management information object instance corresponding to the VNF instance and the ID of the VNF instance.

When the lifecycle operation completion message of the VNF is the confirmation message, sent by the NFVO, for Terminate VNF completion, sending the management information object instance operation request message corresponding to the lifecycle operation of the VNF to the EMS according to the received lifecycle operation completion message of the VNF includes:

the OSS/NMS sending a request message for deletion of the management information object instance corresponding to the VNF instance to the EMS, herein a parameter carried in the request message includes the DN of the management information object instance corresponding to the VNF instance.

When the lifecycle operation completion message of the VNF is the confirmation message, sent by the NFVO, for VNF instance alteration completion, sending the management information object instance operation request message corresponding to the lifecycle operation of the VNF to the EMS according to the received lifecycle operation completion message of the VNF includes:

the OSS/NMS sending a request message for updating of the management information object instance corresponding to the VNF instance to the EMS, herein a parameter carried in the request message includes the DN of the management information object instance corresponding to the VNF instance.

When the lifecycle operation completion message of the VNF is the notification message, sent by the EMS, for VNF instance alteration completion, sending the management information object instance operation request message corresponding to the lifecycle operation of the VNF to the EMS according to the received lifecycle operation completion message of the VNF includes:

the OSS/NMS sending a request message for updating of the management information object instance corresponding to the VNF instance to the EMS, herein a parameter carried in the request message includes the DN of the management information object instance corresponding to the VNF instance.

Embodiment 1

Figure 3:
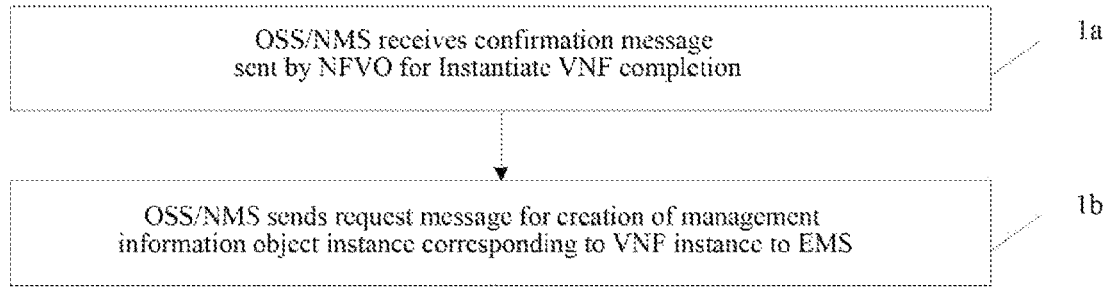
FIG. 3 is a detailed processing flowchart of a method for managing configuration information according to embodiment 1 of the present document.

A detailed processing flow of a method for managing configuration information according to embodiment 1 of the present document, as shown in FIG. 3, includes the following steps:

Step 1a: an OSS/NMS receiving a confirmation message, sent by an NFVO, for Instantiate VNF completion; and Step 1b: the OSS/NMS sending a request message for creation of a management information object instance corresponding to a VNF instance to an EMS, herein a parameter carried in the request message includes a DN of the management information object instance corresponding to the VNF instance, a management information object class name, an ID of the VNF instance, an Internet Protocol (IP) address of the VNF instance, a VNF instance type and an IP address of a VNFM.

Embodiment 2

Figure 4:
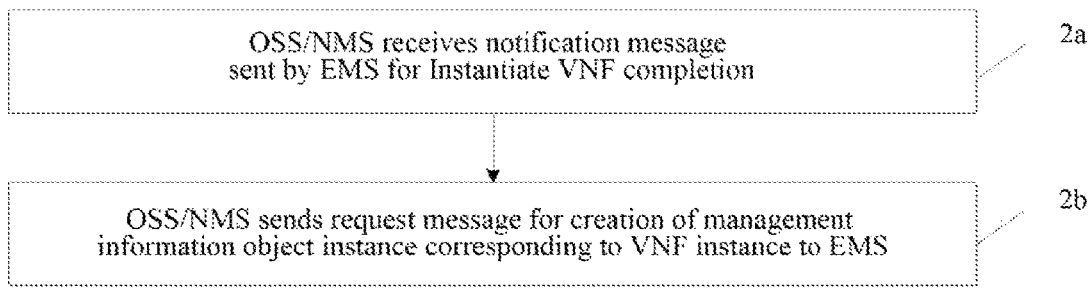
FIG. 4 is a detailed processing flowchart of a method for managing configuration information according to embodiment 2 of the present document.

A detailed processing flow of a method for managing configuration information according to embodiment 2 of the present document, as shown in FIG. 4, includes the following steps:

Step 2a: an OSS/NMS receiving a notification message, sent by an NFVO, for Instantiate VNF completion, herein a parameter carried in the notification message includes an ID of a VNF instance and a VNF instance type; and Step 2b: the OSS/NMS sending a request message for creation of a management information object instance corresponding to the VNF instance to an EMS, herein a parameter carried in the request message includes a DN of the management information object instance corresponding to the VNF instance, a management information object class name and the ID of the VNF instance.

Embodiment 3

Figure 5:
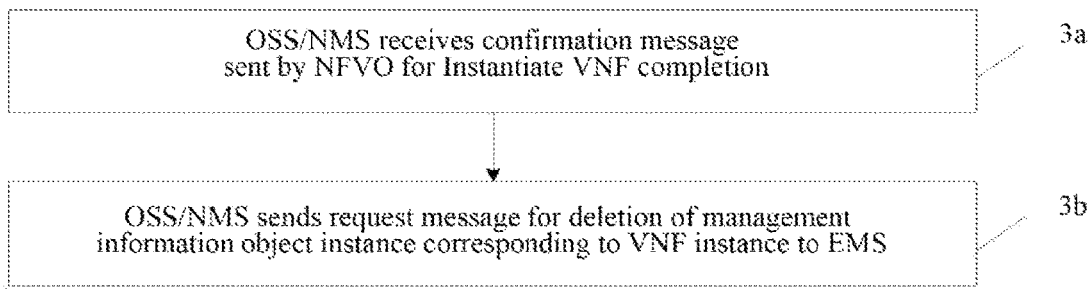
FIG. 5 is a detailed processing flowchart of a method for managing configuration information according to embodiment 3 of the present document.

A detailed processing flow of a method for managing configuration information according to embodiment 3 of the present document, as shown in FIG. 5, includes the following steps:

Step 3a: an OSS/NMS receiving a confirmation message, sent by an NFVO, for Terminate VNF completion; and Step 3b: the OSS/NMS sending a request message for deletion of a management information object instance corresponding to the VNF instance to an EMS, herein a parameter carried in the request message includes a DN of the management information object instance corresponding to the VNF instance.

Embodiment 4

Figure 6:
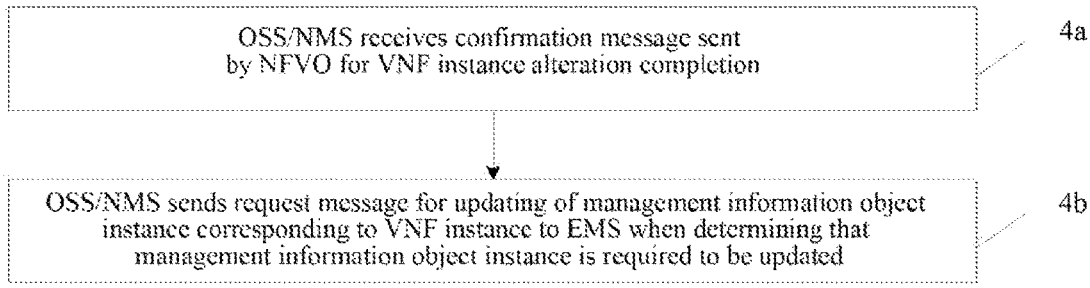
FIG. 6 is a detailed processing flowchart of a method for managing configuration information according to embodiment 4 of the present document.

A detailed processing flow of a method for managing configuration information according to embodiment 4 of the present document, as shown in FIG. 6, includes the following steps:

Step 4a: an OSS/NMS receiving a confirmation message, sent by an NFVO, for VNF instance alteration completion; and Step 4b: the OSS/NMS sending a request message for updating of a management information object instance corresponding to the VNF instance to an EMS when determining that the management information object instance is required to be updated, herein a parameter carried in the request message includes a DN of the management information object instance corresponding to the VNF instance; and factors for determining whether the management information object instance is required to be updated include information such as a VNF instance alteration operation type, whether Instantiate VNF is involved in the alteration operation and whether there is a new VNF instance ID and virtualized network function descriptor (VNFD) version.

Embodiment 5

Figure 7:
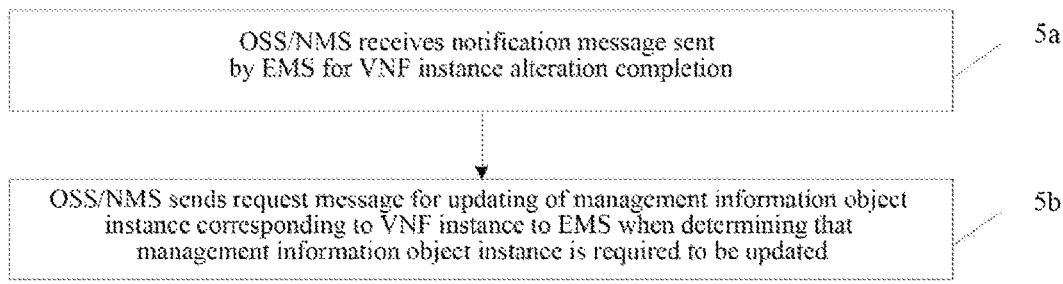
FIG. 7 is a detailed processing flowchart of a method for managing configuration information according to embodiment 5 of the present document.

A detailed processing flow of a method for managing configuration information according to embodiment 5 of the present document, as shown in FIG. 7, includes the following steps:

Step 5a: an OSS/NMS receiving a notification message, sent by an EMS, for VNF instance alteration completion, herein the notification message includes an ID of a VNF instance and a VNF instance alteration type; and Step 5b: the OSS/NMS sending a request message for updating of a management information object instance corresponding to the VNF instance to the EMS when determining that the management information object instance is required to be updated, herein a parameter carried in the request message includes a DN of the management information object instance corresponding to the VNF instance; and factors for determining whether the management information object instance is required to be updated include information such as a VNF instance alteration operation type, whether Instantiate VNF is involved in the alteration operation and whether there is a new VNF instance ID and VNFD version.

Figure 8:
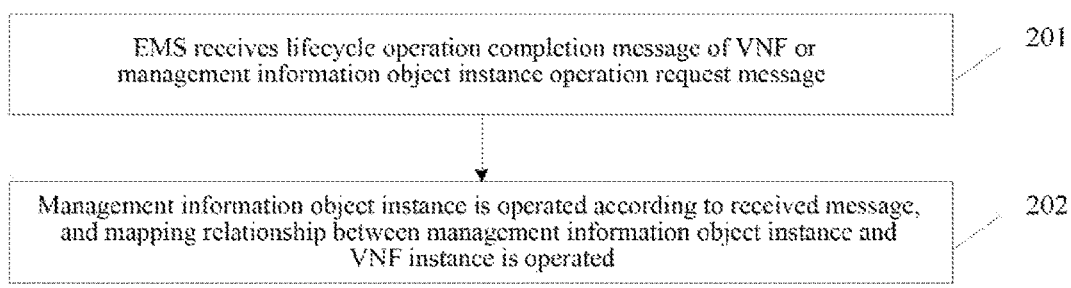
FIG. 8 is a basic processing flowchart of a method for managing configuration information at an EMS side according to an embodiment of the present document.

A basic processing flow of a method for managing configuration information at an EMS side according to the embodiment of the present document, as shown in FIG. 8, includes the following steps:

Step 201: an EMS receiving a lifecycle operation completion message of a VNF or a management information object instance operation request message, herein the lifecycle operation completion message of the VNF includes a notification or confirmation message for Instantiate VNF completion sent by a VNFM or a notification or confirmation message for Terminate VNF completion sent by the VNFM or a notification or confirmation message for VNF instance alteration completion sent by the VNFM;

herein the management information object instance operation request message includes:

an request message, sent by an OSS/NMS, for creation of a management information object instance corresponding to a VNF instance, herein a parameter carried in the request message includes a DN of the management information object instance, a management information object class name, an ID of the VNF instance, an IP address of the VNF instance, a VNF instance type and an IP address of the VNFM;

or a request message, sent by the OSS/NMS, for creation of the management information object instance, herein a parameter carried in the request message includes the DN of the management information object instance, the management information object class name, a virtualized network function descriptor (VNFD) ID, the IP address of the VNFM and a parameter indicating triggering of Instantiate VNF;

or a request message, sent by the OSS/NMS, for deletion of the management information object instance corresponding to the VNF instance, herein the request message includes the DN of the management information object instance corresponding to the VNF instance;

or a request message, sent by the OSS/NMS, for deletion of the management information object instance, herein a parameter carried in the request message includes a parameter indicating triggering of Terminate VNF;

or a request message, sent by the OSS/NMS, for updating of the management information object instance corresponding to the VNF instance, herein a parameter carried in the request message includes the DN of the management information object instance corresponding to the VNF instance;

or a request message, sent by the OSS/NMS, for updating of the management information object instance, herein a parameter carried in the request message includes a parameter indicating triggering of VNF instance alteration and an VNF instance alteration operation type; and Step 202: operating the management information object instance according to the received message, and operating a mapping relationship between the management information object instance and the VNF instance.

Specifically, a) when the EMS receives the request message, sent by the OSS/NMS, for creation of the management information instance corresponding to the VNF instance, the EMS operating the management information object instance and operating the mapping relationship between the management information object instance and the VNF instance includes:

the EMS creating the management information object instance, and creating the mapping relationship between the management information object instance and the VNF instance.

b) When the EMS receives the notification or confirmation message, sent by the VNFM, for Instantiate VNF completion, the EMS operating the management information object instance and operating the mapping relationship between the management information object instance and the VNF instance includes:

the EMS sending the notification message for Instantiate VNF completion to the OSS/NMS, a parameter carried in the notification message including the ID of the VNF instance and the VNF instance type;

the EMS receiving the request message, sent by the OSS/NMS, for creation of the management information instance corresponding to the VNF instance, the parameter carried in the request message including the DN of the management information object instance, the management information object class name and the ID of the VNF instance; and the EMS creating the management information object instance according to the request message, and creating the mapping relationship between the management information object instance and the VNF instance.

c) When the EMS receives the request message, sent by the OSS/NMS, for creation of the management information instance corresponding to the VNF instance, the EMS operating the management information object instance and operating the mapping relationship between the management information object instance and the VNF instance includes:

the EMS sending an Instantiate VNF request message to the VNFM according to the request message;

the EMS receiving the confirmation message, sent by the VNFM, for Instantiate VNF completion; and the EMS creating the management information object instance, and creating the mapping relationship between the management information object instance and the VNF instance.

d) When the EMS receives the request message, sent by the OSS/NMS, for deletion of the management information instance corresponding to the VNF instance, the EMS operating the management information object instance and operating the mapping relationship between the management information object instance and the VNF instance includes:

the EMS deleting the management information object instance according to the request message, and deleting the mapping relationship between the management information object instance and the VNF instance.

e) When the EMS receives the notification or confirmation message, sent by the VNFM, for Terminate VNF completion, the EMS operating the management information object instance and operating the mapping relationship between the management information object instance and the VNF instance includes:

the EMS performing query of the management information object instance corresponding to the VNF instance;

the EMS deleting the management information object instance, and deleting the mapping relationship between the VNF instance and the management information object instance; and the EMS sending a notification message for deletion of the management information object instance to the OSS/NMS.

f) When the EMS receives the request message, sent by the OSS/NMS, for deletion of the management information instance, the EMS operating the management information object instance and operating the mapping relationship between the management information object instance and the VNF instance includes:

the EMS sending a Terminate VNF request message to the VNFM according to the request message;

the EMS receiving a confirmation message, sent by the VNFM, for Terminate VNF; and the EMS deleting the management information object instance according to the request message, and deleting the mapping relationship between the VNF instance and the management information object instance.

g) When the EMS receives the request message, sent by the OSS/NMS, for updating of the management information instance corresponding to the VNF instance, the EMS operating the management information object instance and operating the mapping relationship between the management information object instance and the VNF instance includes:

the EMS updating the management information object instance according to the request message, and updating the mapping relationship between the VNF instance and the management information object instance.

h) When the EMS receives the notification or confirmation message, sent by the VNFM, for VNF instance alteration completion, the EMS operating the management information object instance and operating the mapping relationship between the management information object instance and the VNF instance includes:

the EMS sending the notification message for VNF instance alteration completion to the OSS/NMS, the notification message including the ID of the VNF instance and a VNF instance alteration operation type;

the EMS receiving the request message, sent by the OSS/NMS, for updating of the management information instance request message corresponding to the VNF instance; and the EMS updating the management information object instance corresponding to the VNF instance according to the request message, and updating the mapping relationship between the management information object instance and the VNF instance.

i) When the EMS receives the request message, sent by the OSS/NMS, for updating of the management information instance, the EMS operating the management information object instance and operating the mapping relationship between the management information object instance and the VNF instance includes that:

the EMS sending a VNF instance alteration request message to the VNFM according to the request message;

the EMS receiving the confirmation message, sent by the VNFM, for VNF instance alteration completion; and the EMS updating the management information object instance, and updating the mapping relationship between the management information object instance and the VNF instance.

j) When the EMS receives the notification or confirmation message, sent by the VNFM, for Instantiate VNF completion, the EMS operating the management information object instance and operating the mapping relationship between the management information object instance and the VNF instance includes:

the EMS creating the management information object instance corresponding to the VNF instance, and creating the mapping relationship between the VNF instance and the management information object instance; and the EMS sending a notification message for creation of the management information object instance to the OSS/NMS.

k) When the EMS receives the notification or confirmation message, sent by the VNFM, for VNF instance alteration completion, the EMS operating the management information object instance and operating the mapping relationship between the management information object instance and the VNF instance includes:

the EMS performing query of the management information object instance corresponding to the VNF instance;

the EMS updating the management information object instance corresponding to the VNF instance and updating the mapping relationship between the VNF instance and the management information object instance when determining that the management information object instance is required to be updated; and the EMS sending a notification message for updating of an attribute of the management information object instance to the OSS/NMS.

An attribute of the mapping relationship between the management information object instance and the VNF instance includes the DN of the management information object instance and the ID of the VNF instance. The attribute of the mapping relationship between the management information object instance and the VNF instance further includes one or more of the IP address of the VNF instance, the IP address of the VNFM to which the VNF instance belongs and the VNF instance type.

Figure 9:
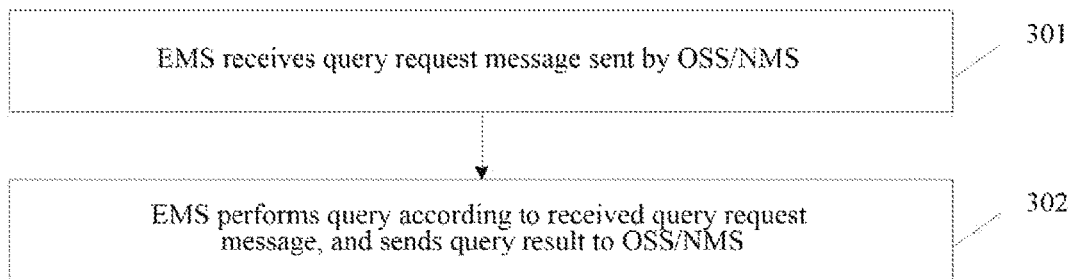
FIG. 9 is another basic processing flowchart of a method for managing configuration information at an EMS side according to an embodiment of the present document.

Another basic processing flow of a method for managing configuration information at an EMS side according to the embodiment of the present document, as shown in FIG. 9, includes the following steps:

Step 301: an EMS receiving a query request message sent by an OSS/NMS, herein the query request message is to perform query of a VNF instance corresponding to a management information object instance, and a parameter carried in the query request message includes a DN of the management information object instance;

or the query request message is to perform query of the management information object instance corresponding to the VNF instance, and the parameter carried in the query request message includes an ID of the VNF instance; and Step 302: the EMS performing the query according to the received query request message, and sending a query result to the OSS/NMS.

The query result includes the DN of the management information object instance and the ID of the VNF instance.

When the query request message is to perform query of the VNF instance corresponding to the management information object instance, and the DN of the management information object instance is not included in the query request message, the EMS sends IDs of all VNF instances and DNs of their corresponding management information object instances to the OSS/NMS.

When the query request message is to perform query of the management information object instance corresponding to the VNF instance, and the ID of the VNF instance is not included in the query request message, the EMS sends DNs of all the management information object instances and IDs of their corresponding VNF instances to the OSS/NMS.

It should be noted that Step 201~Step 202 and Step 301~Step 302 are mutually independent operation processes in the embodiment.

Embodiment 6

Figure 10:
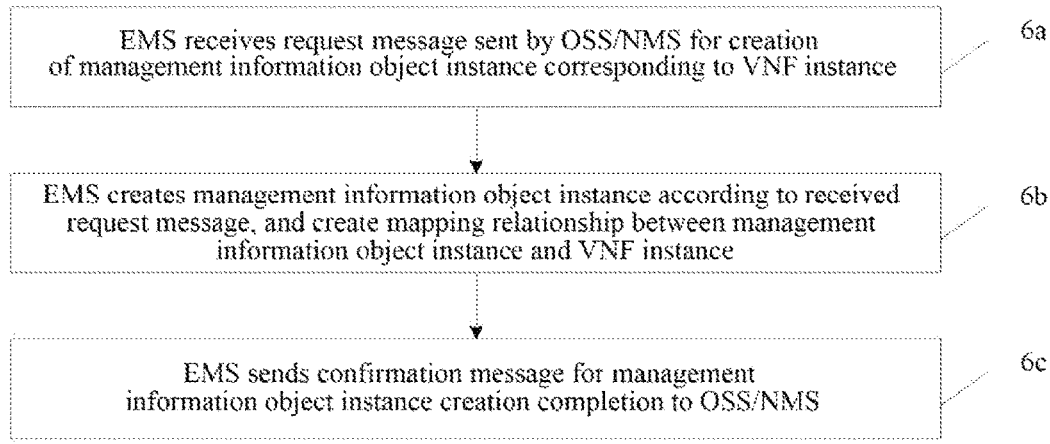
FIG. 10 is a detailed processing flowchart of a method for managing configuration information according to embodiment 6 of the present document.

A detailed processing flow of a method for managing configuration information according to embodiment 6 of the present document, as shown in FIG. 10, includes the following steps:

Step 6a: an EMS receiving a request message, sent by an OSS/NMS, for creation of a management information object instance corresponding to a VNF instance, herein the request message includes a DN of the management information object instance, a management information object class name, an ID of the VNF instance, an IP address of the VNF instance, a VNF instance type and an IP address of a VNFM; and Step 6b: the EMS creating the management information object instance according to the received request message, and creating a mapping relationship between the management information object instance and the VNF instance; and Step 6c: the EMS sending a confirmation message for management information object instance creation completion to the OSS/NMS.

Embodiment 7

Figure 11:
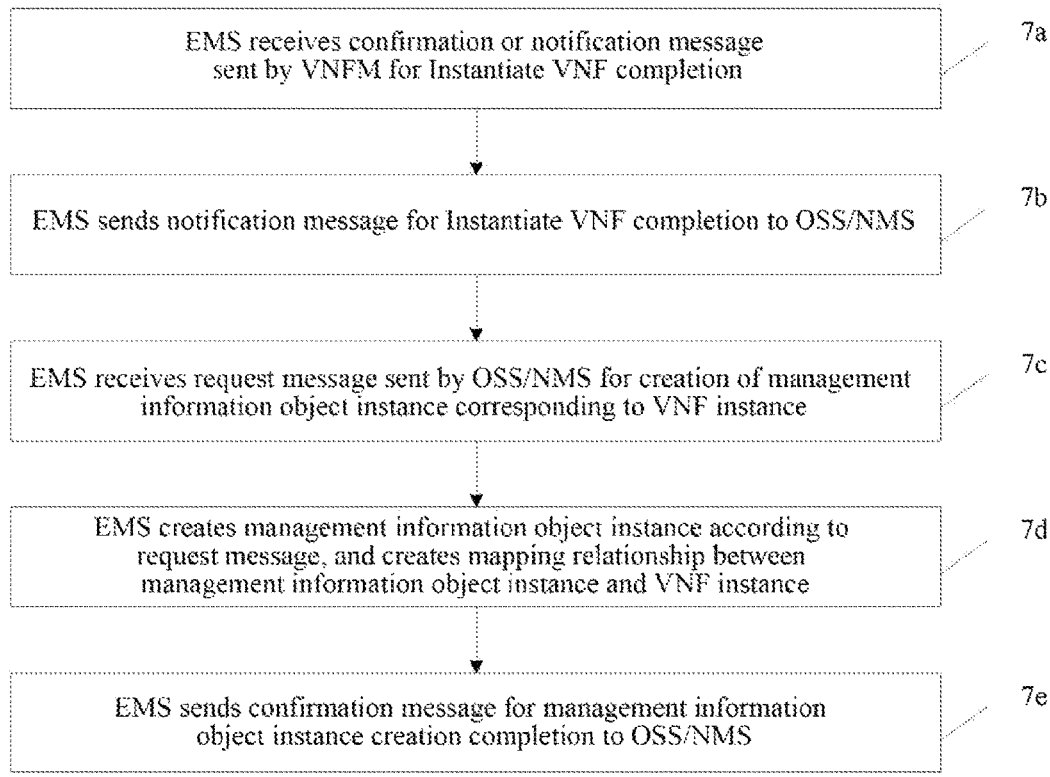
FIG. 11 is a detailed processing flowchart of a method for managing configuration information according to embodiment 7 of the present document.

A detailed processing flow of a method for managing configuration information according to embodiment 7 of the present document, as shown in FIG. 11, includes the following steps:

Step 7a: an EMS receiving a confirmation or notification message, sent by a VNFM, for Instantiate VNF completion;

Step 7b: the EMS sending the notification message for Instantiate VNF completion to an OSS/NMS, herein the notification message includes an ID of a VNF instance and a VNF instance type;

Step 7c: the EMS receiving a request message, sent by the OSS/NMS, for creation of a management information object instance corresponding to the VNF instance, herein the request message includes a DN of the management information object instance, a management information object class name and the ID of the VNF instance;

Step 7d: the EMS creating the management information object instance according to the request message, and creating a mapping relationship between the management information object instance and the VNF instance; and Step 7e: the EMS sending a confirmation message for management information object instance creation completion to the OSS/NMS.

Embodiment 8

Figure 12:
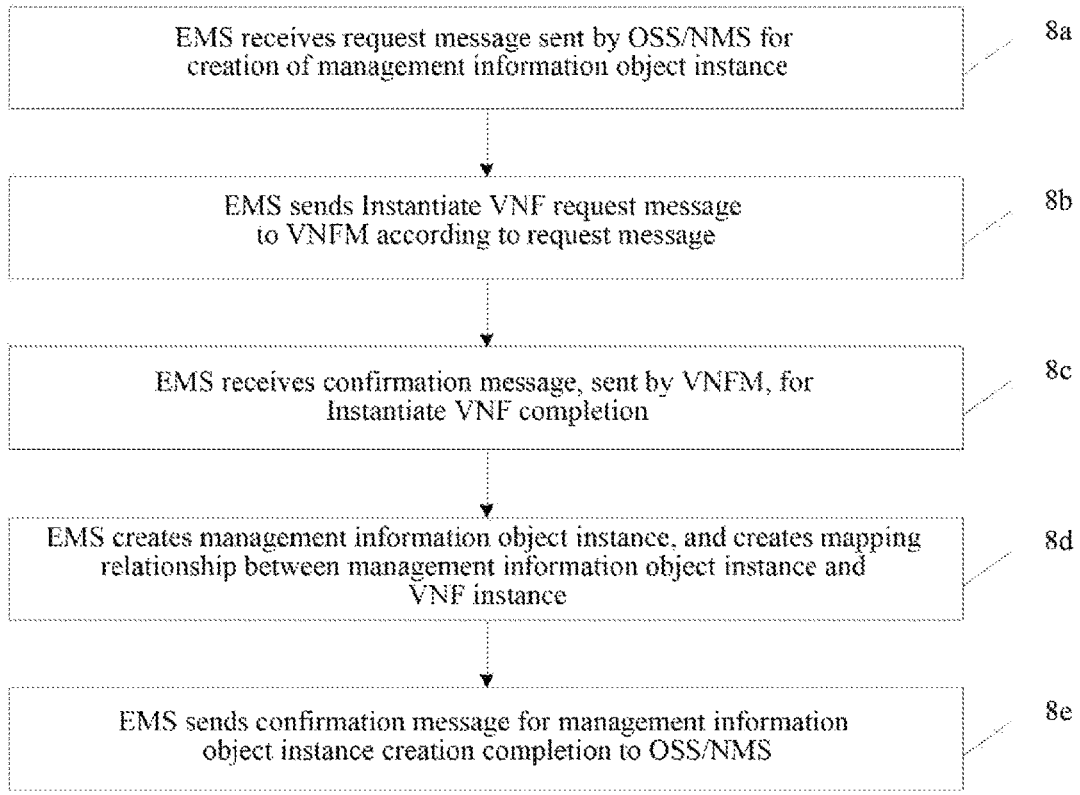
FIG. 12 is a detailed processing flowchart of a method for managing configuration information according to embodiment 8 of the present document.

A detailed processing flow of a method for managing configuration information according to embodiment 8 of the present document, as shown in FIG. 12, includes the following steps:

Step 8a: an EMS receiving a request message, sent by an OSS/NMS, for creation of a management information object instance, herein the request message includes a DN of the management information object instance, a management information object type name, a VNFD ID, an IP address of a VNFM and a parameter indicating triggering of Instantiate VNF;

Step 8b: the EMS sending an Instantiate VNF request message to the VNFM according to the request message;

Step 8c: the EMS receiving a confirmation message, sent by the VNFM, for Instantiate VNF completion;

Step 8d: the EMS creating the management information object instance, and creating a mapping relationship between the management information object instance and a VNF instance; and Step 8e: the EMS sending a confirmation message for management information object instance creation completion to the OSS/NMS.

Embodiment 9

Figure 13:
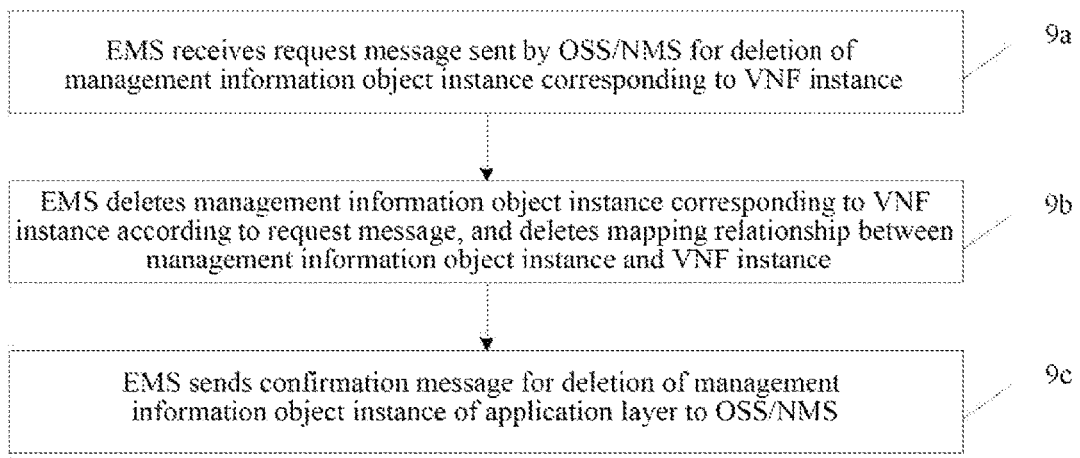
FIG. 13 is a detailed processing flowchart of a method for managing configuration information according to embodiment 9 of the present document.

A detailed processing flow of a method for managing configuration information according to embodiment 9 of the present document, as shown in FIG. 13, includes the following steps:

Step 9a: an EMS receiving a request message, sent by an OSS/NMS, for deletion of a management information object instance corresponding to a VNF instance, herein the request message includes a DN of the management information object instance corresponding to the VNF instance;

Step 9b: the EMS deleting the management information object instance corresponding to the VNF instance according to the request message, and deleting a mapping relationship between the management information object instance and the VNF instance; and Step 9c: the EMS sending a confirmation message for deletion of the management information object instance to the OSS/NMS.

Embodiment 10

Figure 14:
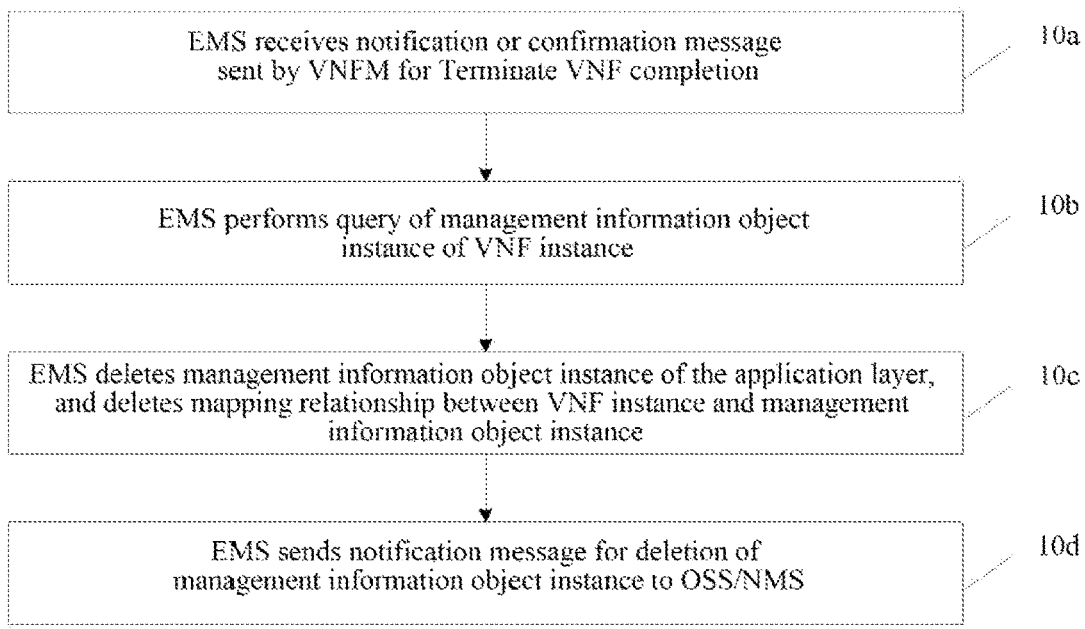
FIG. 14 is a detailed processing flowchart of a method for managing configuration information according to embodiment 10 of the present document.

A detailed processing flow of a method for managing configuration information according to embodiment 10 of the present document, as shown in FIG. 14, includes the following steps:

Step 10a: an EMS receives a notification or confirmation message, sent by a VNFM, for Terminate VNF completion, herein the message includes an ID of a VNF instance;

Step 10b: the EMS performing query of a management information object instance of the VNF instance;

herein specifically, the EMS performing query of the management information object instance of the VNF instance according to the ID of the VNF instance in the received message;

Step 10c: the EMS deleting the management information object instance, and deleting a mapping relationship between the VNF instance and the management information object instance; and Step 10d: the EMS sending a notification message for deletion of the management information object instance to the OSS/NMS.

Embodiment 11

Figure 15:
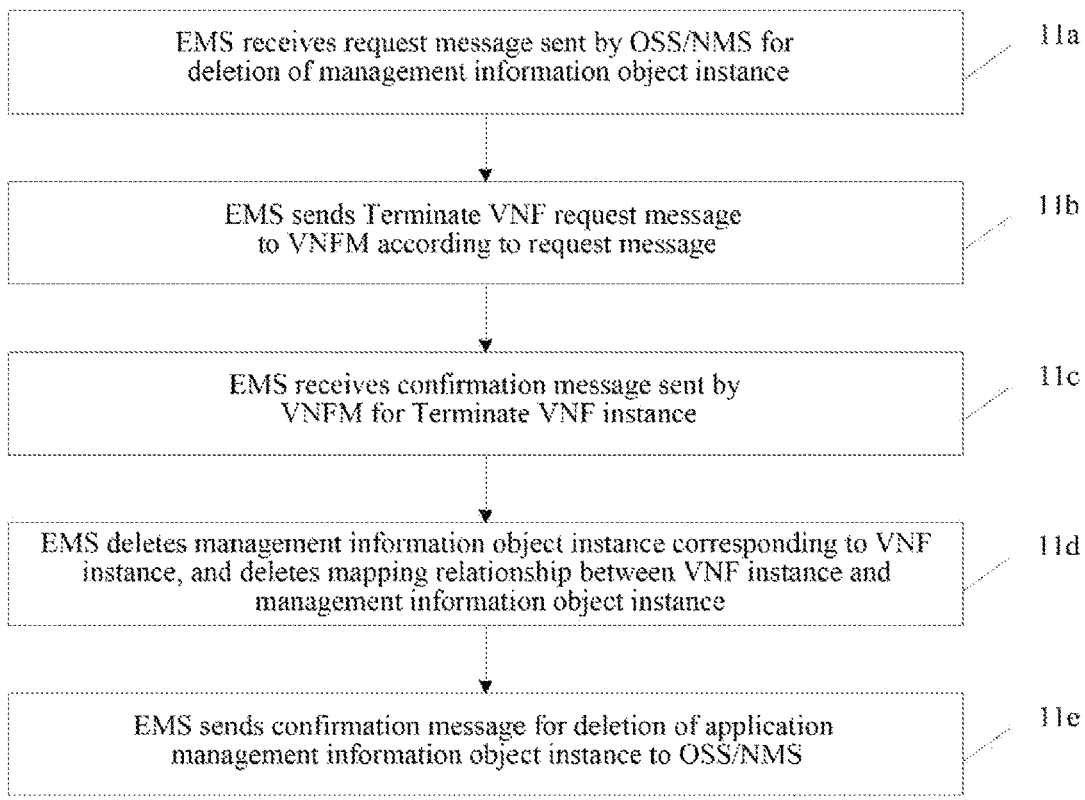
FIG. 15 is a detailed processing flowchart of a method for managing configuration information according to embodiment 11 of the present document.

A detailed processing flow of a method for managing configuration information according to embodiment 11 of the present document, as shown in FIG. 15, includes the following steps:

Step 11a: an EMS receiving a request message, sent by an OSS/NMS, for deletion of a management information object instance, herein a parameter carried in the request message includes a DN of the management information object instance, an ID of a VNF instance and a parameter indicating triggering of Terminate VNF;

Step 11b: the EMS sending a Terminate VNF request message to a VNFM according to the request message, herein specifically, the EMS performs query of an IP address of the VNFM corresponding to the VNF instance according to the DN of the management information object instance, and sends the Terminate VNF request message to the VNFM according to the IP address of the VNFM, herein the request message includes the ID of the VNF instance;

Step 11c: the EMS receiving a confirmation message, sent by the VNFM, for Terminate VNF;

Step 11d: the EMS deleting the management information object instance corresponding to the VNF instance, and deleting a mapping relationship between the VNF instance and the management information object instance; and Step 11e: the EMS sending a confirmation message for deletion of the management information object instance to the OSS/NMS.

Embodiment 12

Figure 16:
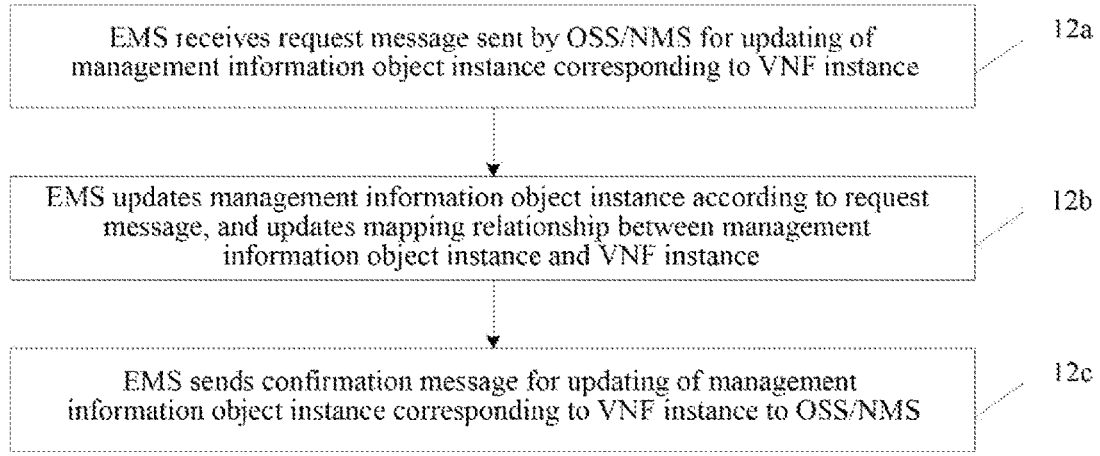
FIG. 16 is a detailed processing flowchart of a method for managing configuration information according to embodiment 12 of the present document.

A detailed processing flow of a method for managing configuration information according to embodiment 12 of the present document, as shown in FIG. 16, includes the following steps:

Step 12a: an EMS receiving a request message, sent by an OSS/NMS, for updating of a management information object instance corresponding to a VNF instance, herein a parameter carried in the request message includes a DN of the management information object instance corresponding to the VNF instance;

Step 12b: the EMS updating the management information object instance according to the request message, and updating a mapping relationship between the management information object instance and the VNF instance; and Step 12c: the EMS sending a confirmation message for updating of the management information object instance corresponding to the VNF instance to the OSS/NMS.

Embodiment 13

Figure 17:
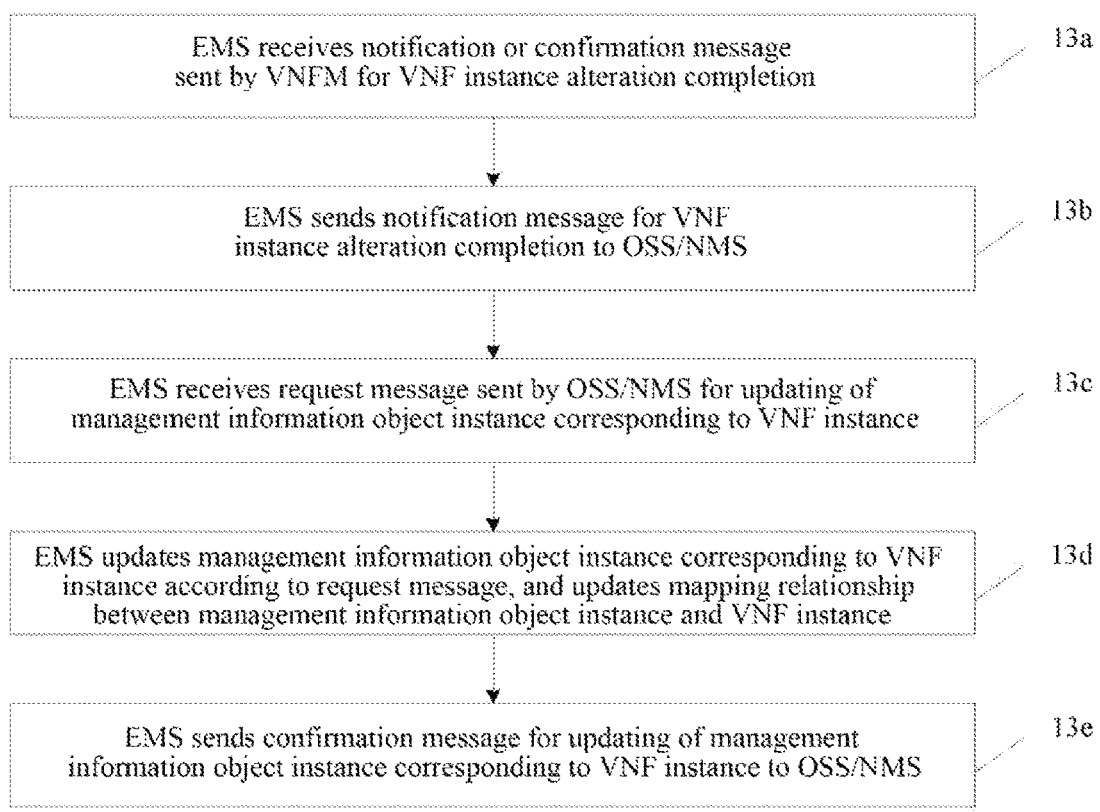
FIG. 17 is a detailed processing flowchart of a method for managing configuration information according to embodiment 13 of the present document.

A detailed processing flow of a method for managing configuration information according to embodiment 13 of the present document, as shown in FIG. 17, includes the following steps:

Step 13a: an EMS receiving a notification or confirmation message, sent by a VNFM, for VNF instance alteration completion, Herein the VNF instance alteration includes other operations within a lifecycle of a VNF than Instantiate VNF and Terminate VNF, such as Scale VNF, Upgrade VNF and Modify VNF, herein Scale VNF may further be subdivided into Scale in, Scale out, Scale up and Scale down;

Step 13b: the EMS sending the notification message for VNF instance alteration completion to an OSS/NMS, herein a parameter carried in the notification message includes an ID of a VNF instance and a VNF instance alteration operation type;

Step 13c: the EMS receiving a request message, sent by the OSS/NMS, for updating of a management information object instance corresponding to the VNF instance;

Step 13d: the EMS updating the management information object instance corresponding to the VNF instance according to the request message, and updating a mapping relationship between the management information object instance and the VNF instance; and Step 13e: the EMS sending a confirmation message for updating of the management information object instance corresponding to the VNF instance to the OSS/NMS.

Embodiment 14

Figure 18:
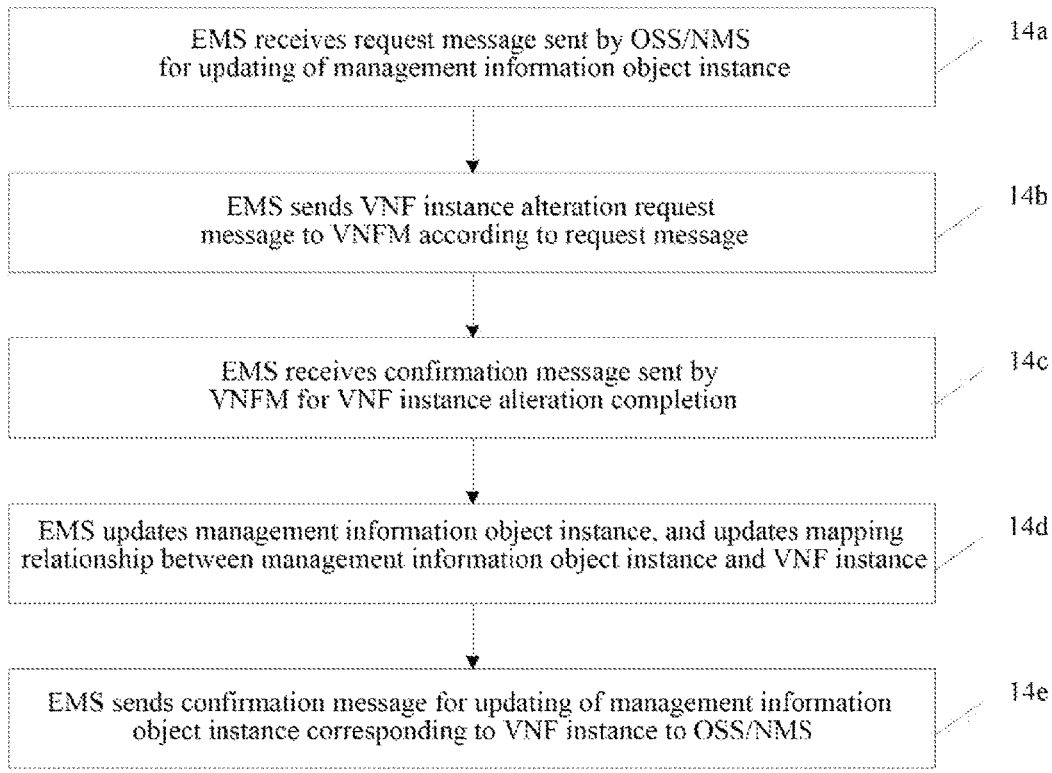
FIG. 18 is a detailed processing flowchart of a method for managing configuration information according to embodiment 14 of the present document.

A detailed processing flow of a method for managing configuration information according to embodiment 14 of the present document, as shown in FIG. 18, includes the following steps:

Step 14a: an EMS receiving a request message, sent by an OSS/NMS, for updating of a management information object instance, herein a parameter carried in the request message includes a DN of the management information object instance, an ID of a VNF instance and a VNF instance alteration operation type;

Step 14b: the EMS sending a VNF instance alteration request message to a VNFM according to the request message, herein specifically, the EMS performs query of an IP address of the VNFM corresponding to the VNF instance according to the DN of the management information object instance, and sending a Terminate VNF request message to the VNFM according to the IP address of the VNFM; and herein a parameter carried in the request message includes the DN of the management information object instance;

Step 14c: the EMS receiving a confirmation message, sent by the VNFM, for VNF instance alteration completion;

Step 14d: the EMS updating the management information object instance, and updating a mapping relationship between the management information object instance and the VNF instance; and Step 14e: the EMS sending a confirmation message for updating of the management information object instance corresponding to the VNF instance to the OSS/NMS.

Embodiment 15

Figure 19:
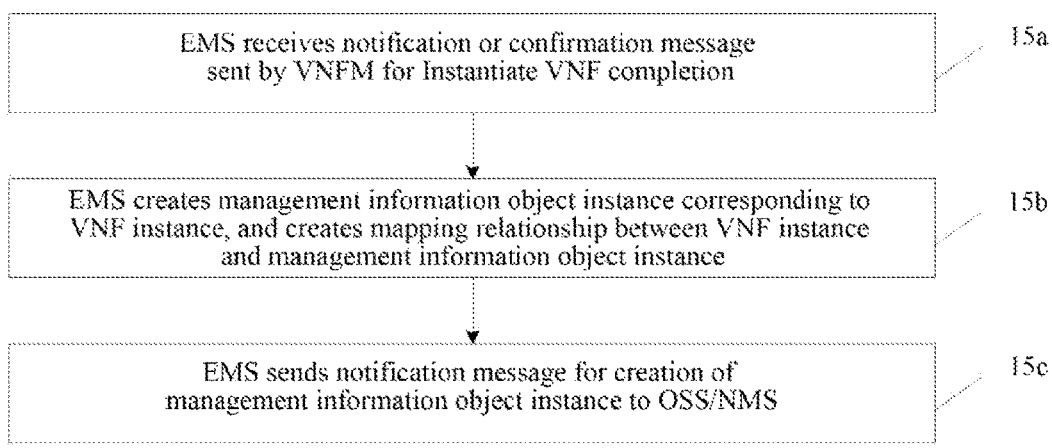
FIG. 19 is a detailed processing flowchart of a method for managing configuration information according to embodiment 15 of the present document.

A detailed processing flow of a method for managing configuration information according to embodiment 15 of the present document, as shown in FIG. 19, includes the following steps:

Step 15a: an EMS receiving a notification or confirmation message, sent by a VNFM, for Instantiate VNF completion, herein a parameter carried in the message includes an ID of a VNF instance, a VNF instance type and an IP address of a VNF;

Step 15b: the EMS creating a management information object instance corresponding to the VNF instance, and creating a mapping relationship between the VNF instance and the management information object instance; and Step 15c: the EMS sending a notification message for creation of the management information object instance to the OSS/NMS.

Embodiment 16

Figure 20:
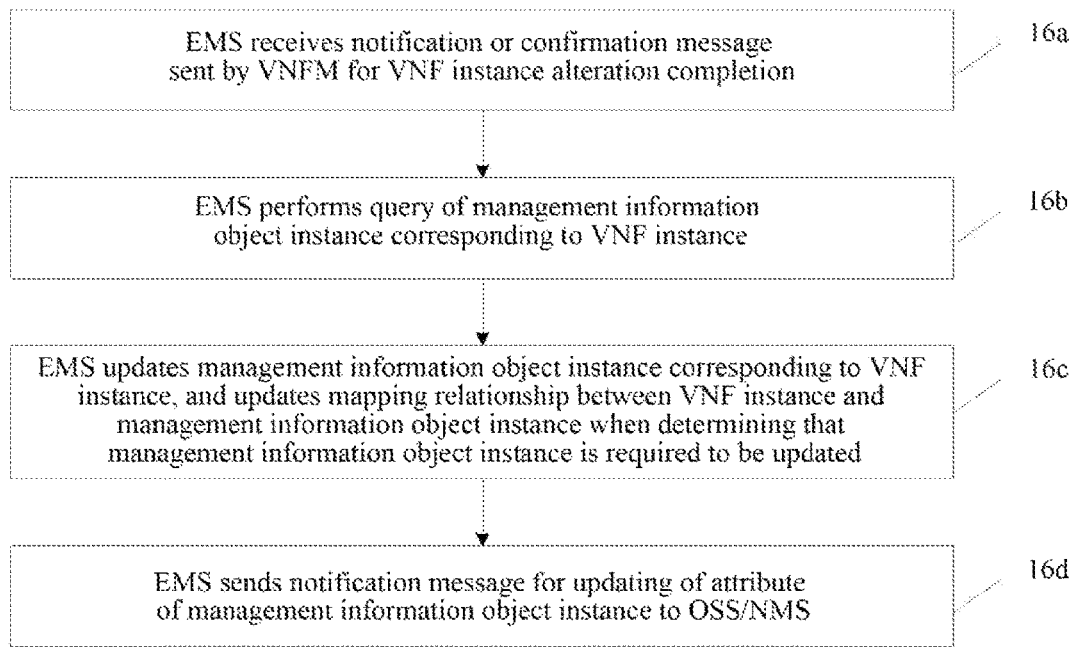
FIG. 20 is a detailed processing flowchart of a method for managing configuration information according to embodiment 16 of the present document.

A detailed processing flow of a method for managing configuration information according to embodiment 16 of the present document, as shown in FIG. 20, includes the following steps:

Step 16a: an EMS receiving a notification or confirmation message, sent by a VNFM, for VNF instance alteration completion, herein a parameter carried in the message includes an ID of a VNF instance and a VNF instance alteration operation type;

Step 16b: the EMS performs query of a management information object instance corresponding to the VNF instance;

Step 16c: the EMS updating the management information object instance corresponding to the VNF instance and updating a mapping relationship between the VNF instance and the management information object instance when determining that the management information object instance is required to be updated; and Step 16d: the EMS sending a notification message for updating of an attribute of the management information object instance to the OSS/NMS.

Embodiment 17

Figure 21:
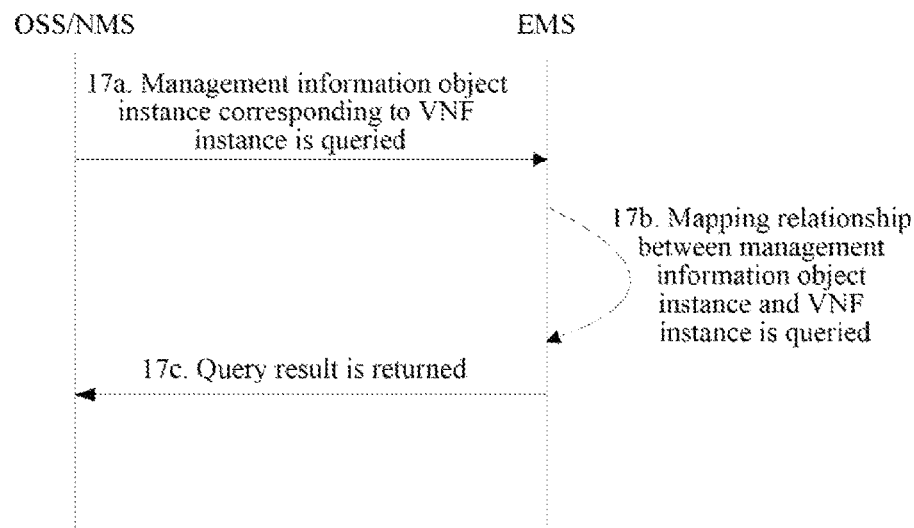
FIG. 21 is a detailed processing flowchart of a method for managing configuration information according to embodiment 17 of the present document.

After element functions are virtualized, a query function of a network management system may determine which elements are virtualized elements according to a DN of a management information object instance. A detailed processing flow of a method for managing configuration information according to embodiment 17 of the present document, as shown in FIG. 21, includes the following steps:

Step 17a: an EMS receiving a query request message sent by an OSS/NMS, herein the query request message is to perform query of a VNF instance corresponding to the management information object instance, and a parameter carried in the query request message includes a DN of the management information object instance;

Step 17b: the EMS performing query of the VNF instance corresponding to the management information object instance; and Step 17c: the EMS sending a query result to the OSS/NMS, herein the query result includes the DN of the management information object instance and an ID of the VNF instance.

Specifically, when the DN of the management information object instance is not included in the query request message, the EMS sends IDs of all VNF instances and DNs of their corresponding management information object instances to the OSS/NMS.

Embodiment 18

Figure 22:
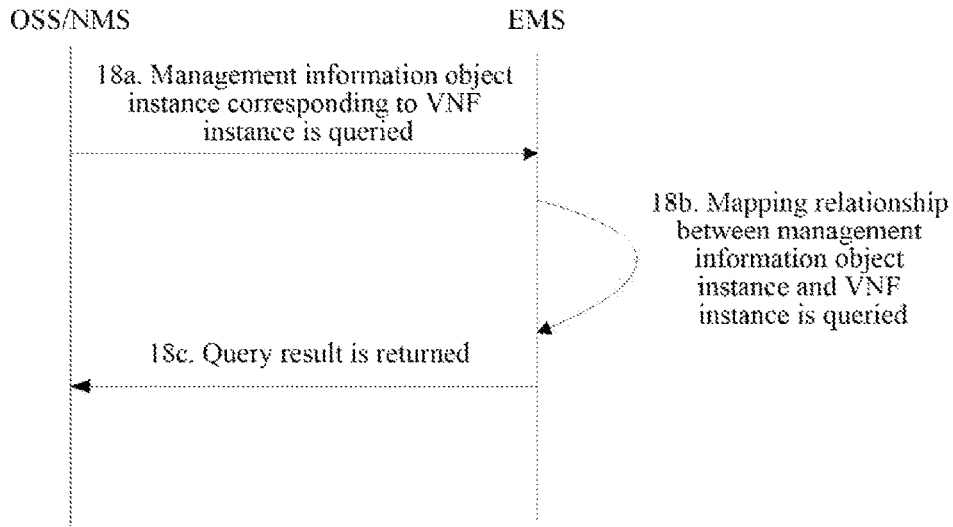
FIG. 22 is a detailed processing flowchart of a method for managing configuration information according to embodiment 18 of the present document.

After element functions are virtualized, a query function of a network management system may determine application layer configuration information corresponding to a VNF instance according to an ID of the VNF instance. A detailed processing flow of a method for managing configuration information according to embodiment 18 of the present document, as shown in FIG. 22, includes the following steps:

Step 18a: an EMS receiving a query request message sent by an OSS/NMS, herein the query request message is to perform query of a management information object instance corresponding to the VNF instance, and a parameter carried in the query request message includes the ID of the VNF instance;

Step 18b: the EMS performing query of the management information object instance corresponding to the VNF instance; and Step 18c: the EMS sending a query result to the OSS/NMS, herein the query request includes a DN of the management information object instance and the ID of the VNF instance.

Specifically, when the query request message is to perform query of the management information object instance corresponding to the VNF instance, and the ID of the VNF instance is included in the query request message, the EMS sends DNs of all management information object instances and IDs of their corresponding VNF instances to the OSS/NMS.

Embodiment 19

Figure 23:
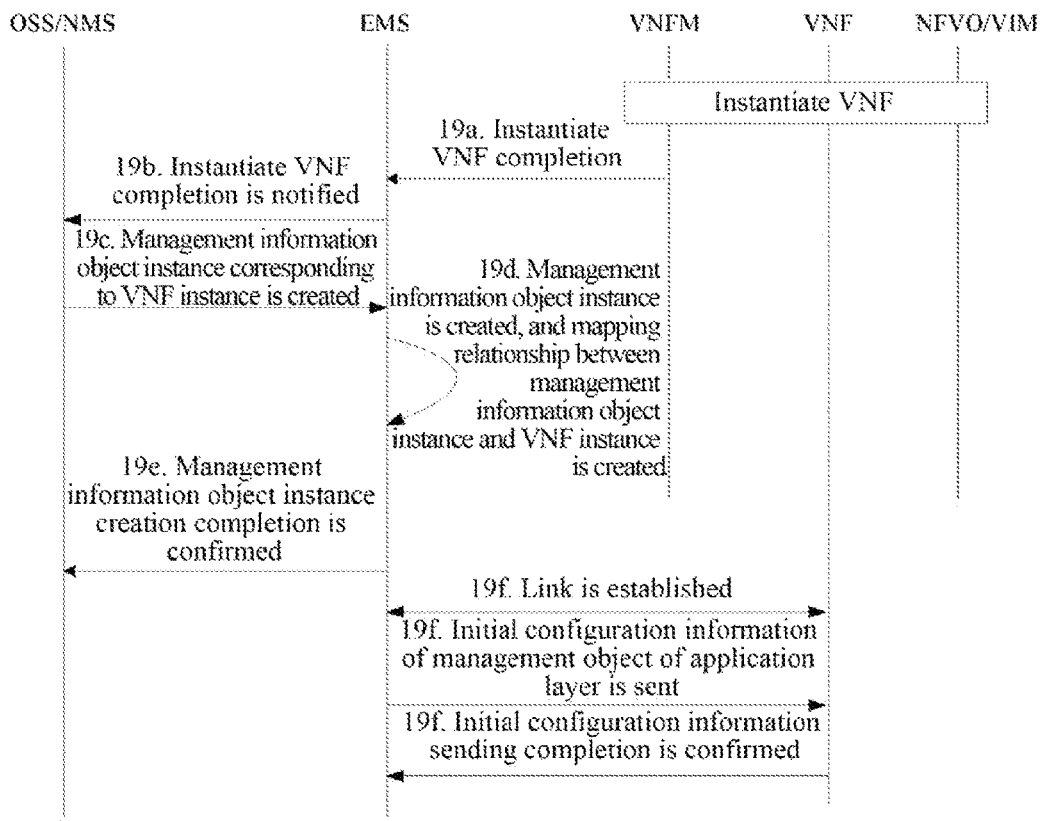
FIG. 23 is a detailed processing flowchart of a method for managing configuration information according to embodiment 19 of the present document.

After element functions are virtualized, an Instantiate VNF operation used to start a lifecycle of a VNF is required to be associated with creation of a management information object instance to ensure that each VNF instance has its corresponding management information object instance, which contains application layer configuration information of the VNF. After completion of the Instantiate VNF operation, a VNFM triggers an application layer initial configuration process of the VNF. A detailed processing flow of a method for managing configuration information according to embodiment 19 of the present document, as shown in FIG. 23, includes the following steps:

Step 19a: an EMS receiving a notification or confirmation message, sent by a VNFM, for Instantiate VNF completion, herein a parameter carried in the message includes an ID of a VNF instance, a VNF instance type and an IP address of the VNF instance;

Step 19b: the EMS sending the notification message for Instantiate VNF completion to an OSS/NMS, herein a parameter carried in the notification message includes the ID of the VNF instance and the VNF instance type;

Step 19c: the OSS/NMS sending a request message for creation of the management information object instance corresponding to the VNF instance to the EMS after receiving the notification message, herein a parameter carried in the request message includes a DN of the management information object instance, a management information object class name and the ID of the VNF instance;

Step 19d: the EMS receiving the request message, sent by the OSS/NMS, for creation of the management information object instance corresponding to the VNF instance, creating the management information object instance according to the request message, and creating a mapping relationship between the management information object instance and the VNF instance;

Step 19e: the EMS sending a confirmation message for management information object instance creation completion to the OSS/NMS; and Step 19f: the EMS establishing a link with the VNF instance according to the IP address used for managing access in the VNF instance, and sending application layer configuration information to the VNF instance.

Embodiment 20

Figure 24:
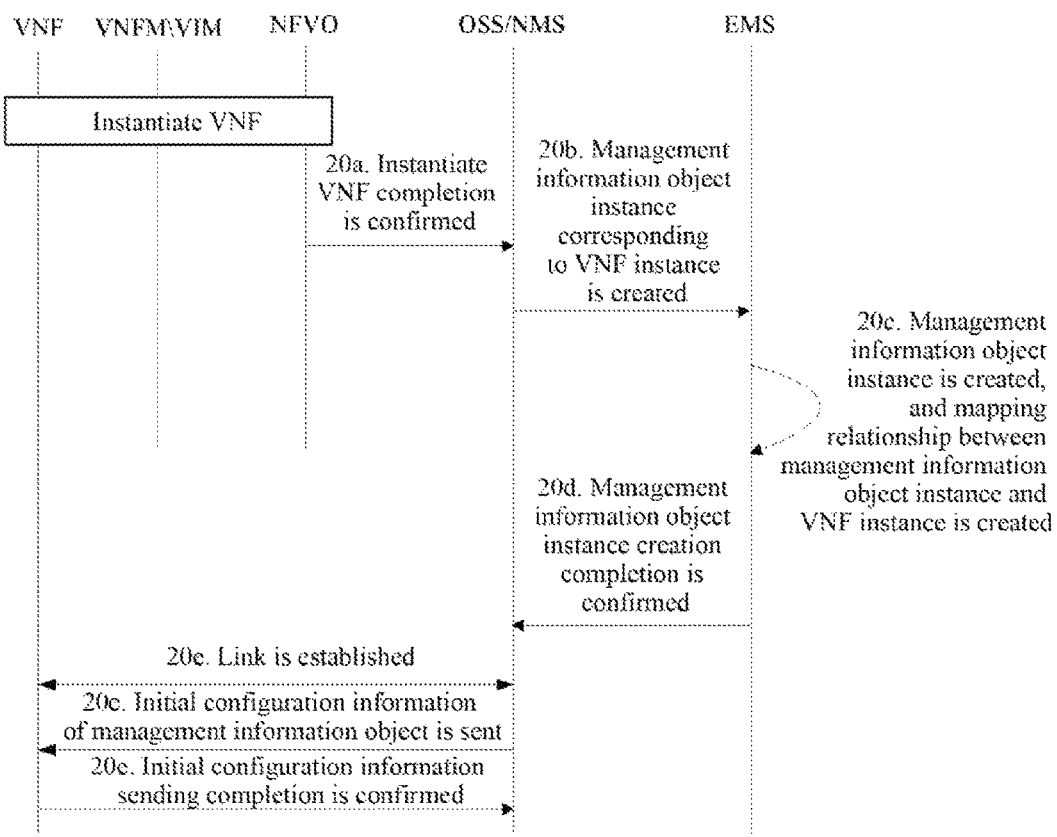
FIG. 24 is a detailed processing flowchart of a method for managing configuration information according to embodiment 20 of the present document.

After completion of an Instantiate VNF operation, an OSS/NMS is informed of Instantiate VNF completion, and triggers an application layer initial configuration process. A detailed processing flow of a method for managing configuration information according to embodiment 20 of the present document, as shown in FIG. 24, includes the following steps:

Step 20a: the OSS/NMS receiving a confirmation message, sent by a NFVO, for Instantiate VNF completion;

Step 20b: the OSS/NMS sending a request message for creation of a management information object instance corresponding to a VNF instance to an EMS, herein a parameter carried in the request message includes a DN of the management information object instance, a management information object class name, an ID of the VNF instance, an IP address of the VNF instance and an IP address of a VNFM which a VNF belongs to;

Step 20c: the EMS creating the information object instance according to the request message, and creating a mapping relationship between the information object instance and the VNF instance after receiving the request message;

Step 20d: the EMS sending a confirmation message for management information object instance creation completion to the OSS/NMS; and Step 20e: the EMS establishing a link with the VNF instance according to the IP address used for managing access in the VNF instance, and sending application layer configuration information to the VNF instance.

Embodiment 21

Figure 25:
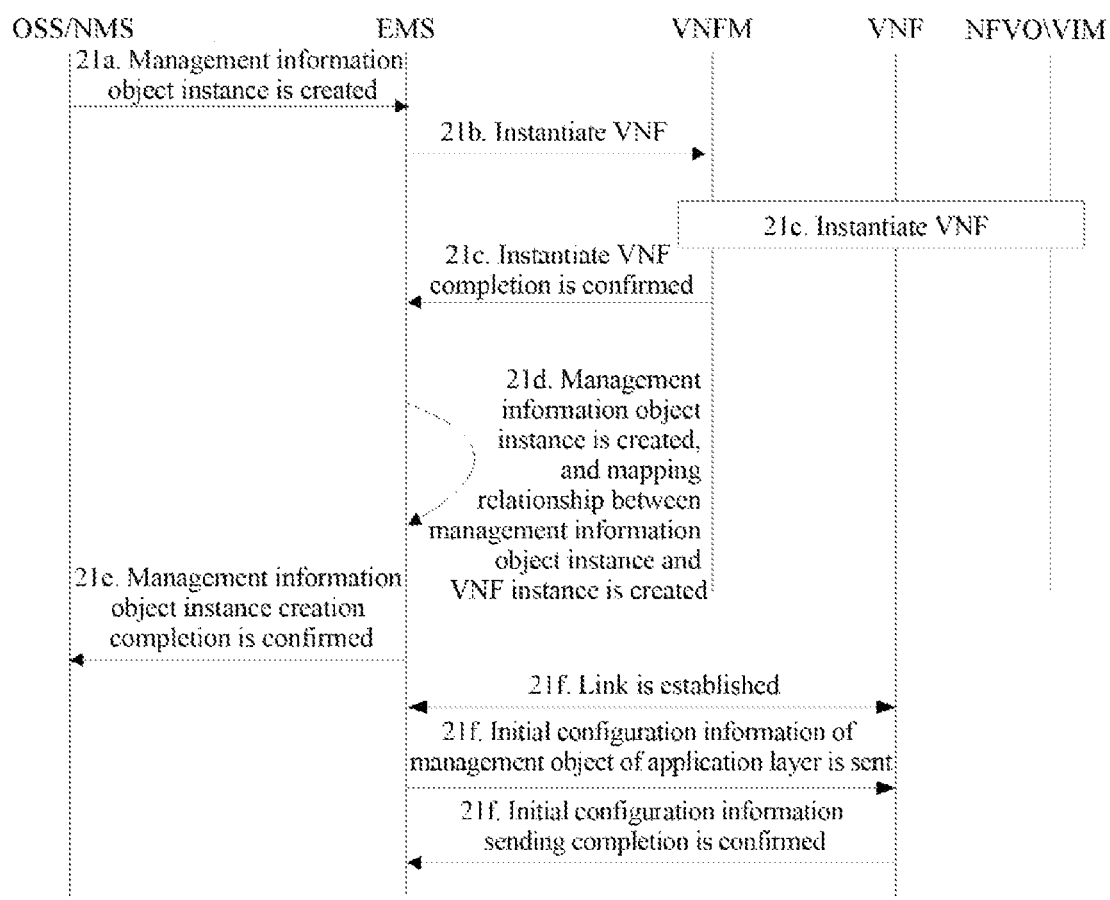
FIG. 25 is a detailed processing flowchart of a method for managing configuration information according to embodiment 21 of the present document.

An OSS/NMS triggers an application layer initial configuration process to trigger Instantiate VNF. A detailed processing flow of a method for managing configuration information according to embodiment 21 of the present document, as shown in FIG. 25, includes the following steps:

Step 21a: the OSS/NMS sending an information object instance request message to an EMS, herein a parameter carried in the request message includes a DN of a management information object instance, a VNFD ID and an IP address of a VNFM; and the request message implicitly indicates, through the VNFD ID parameter, that the EMS is required to send an Instantiate VNF request message to the VNFM or indicates triggering of Instantiate VNF by adding an Instantiate VNF marker on the basis of the parameter carried in the request message;

Step 21b: the EMS receiving the request message, and sending the Instantiate VNF request message to the VNFM according to the IP address of the VNFM in the message, herein the parameter carried in the message includes the VNFD ID, the DN of the management information object instance and the like;

Step 21c: the VNFM receiving the Instantiate VNF request message to complete Instantiate VNF, and sending a confirmation message for Instantiate VNF completion to the EMS, herein a parameter carried in the confirmation message includes an ID of a VNF instance, an IP address of the VNF instance, a VNF instance type, the DN of the management information object instance corresponding to the VNF instance, and the like;

Step 21d: the EMS receiving the confirmation message for Instantiate VNF completion, creating the information object instance, and creating a mapping relationship between the information object instance and the VNF instance;

Step 21e: the EMS sending a confirmation message for management information object instance creation completion to the OSS/NMS; and Step 21f: the EMS establishing a link with the VNF instance according to the IP address used for managing access in the VNF instance, and sending application layer configuration information to the VNF instance.

Embodiment 22

Figure 26:
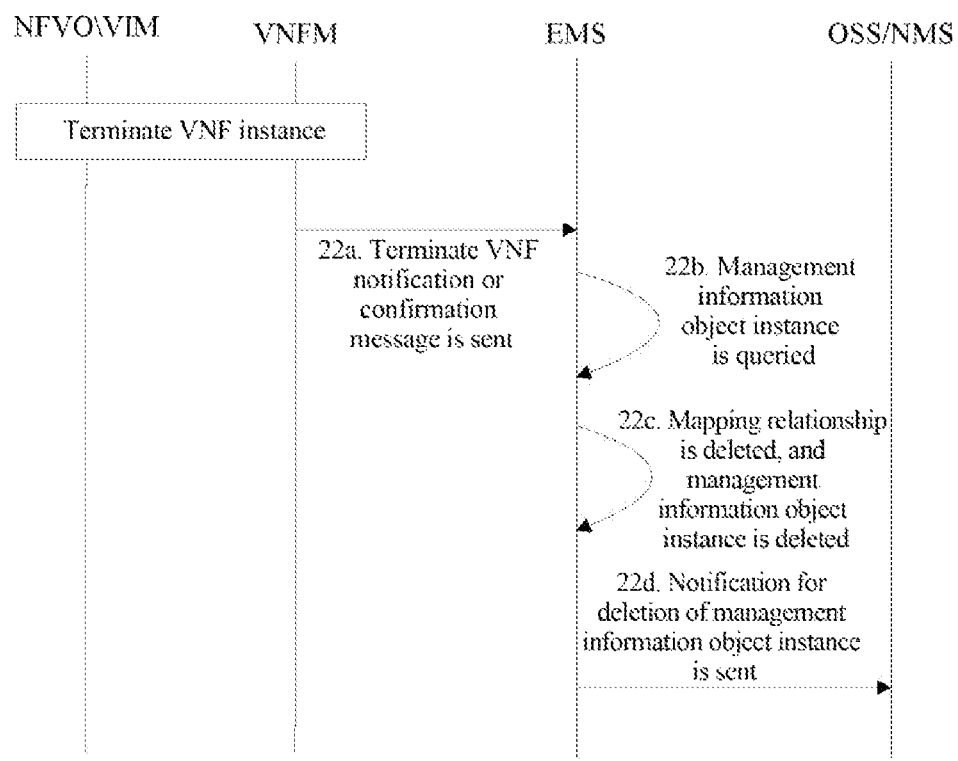
FIG. 26 is a detailed processing flowchart of a method for managing configuration information according to embodiment 22 of the present document.

After element functions are virtualized, a Terminate VNF operation used to terminate a lifecycle of a VNF is required to be associated with deletion of a management information object instance to ensure that the management information object instance corresponding to a VNF instance can be timely deleted after the Terminate VNF operation is completed such that information of a network management system is consistent with information in a practical network. After completion of the Terminate VNF operation, a VNFM triggers a process of deleting application layer configuration information. A detailed processing flow of a method for managing configuration information according to embodiment 22 of the present document, as shown in FIG. 26, includes the following steps:

Step 22a: an EMS receiving a notification or confirmation message, sent by the VNFM, for Terminate VNF, herein a parameter carried in the message includes an ID of a VNF instance;

Step 22b: the EMS performing query of a management information object instance corresponding to the VNF instance according to the ID of the VNF instance in the message;

Step 22c: the EMS deleting the queried management information object instance, and deleting a mapping relationship between the VNF instance and the management information object instance; and Step 22d: the EMS sending a notification message for deletion of the management information object instance to an OSS/NMS.

Embodiment 23

Figure 27:
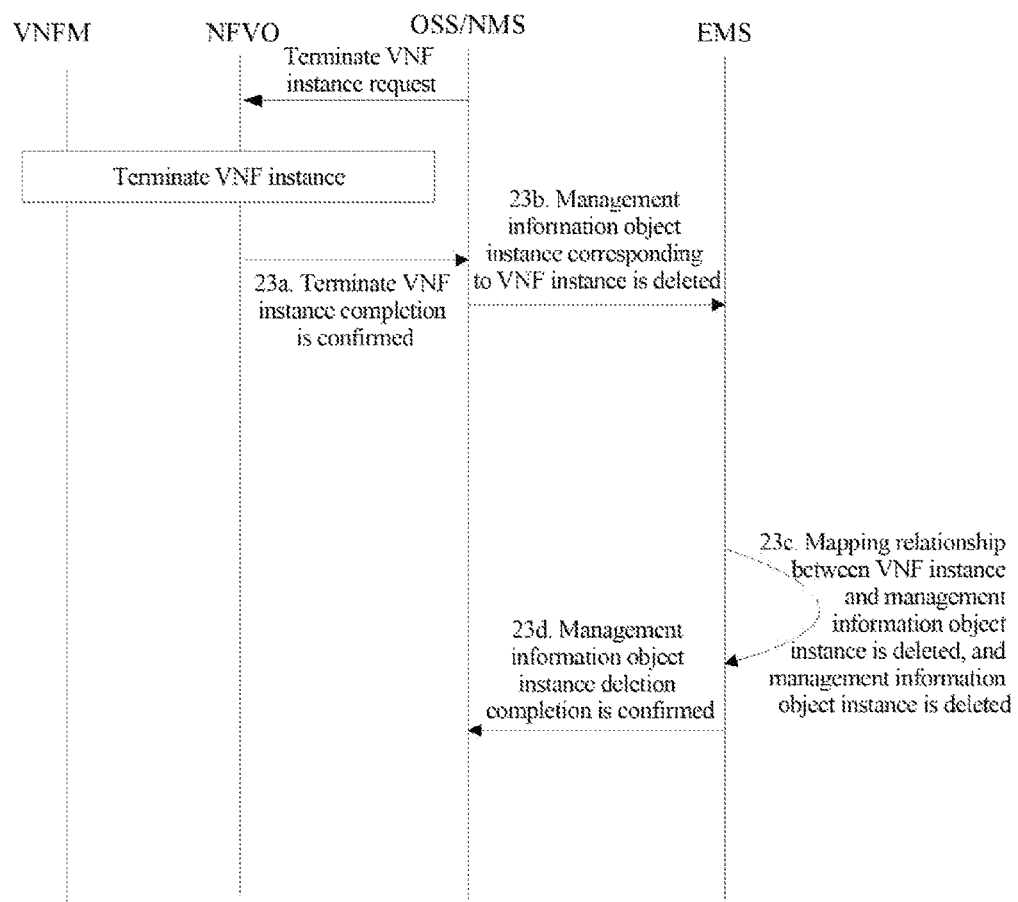
FIG. 27 is a detailed processing flowchart of a method for managing configuration information according to embodiment 23 of the present document.

After completion of a Terminate VNF operation, an OSS/NMS is informed of Terminate VNF, and triggers a process of deleting application layer configuration information. A detailed processing flow of a method for managing configuration information according to embodiment 23 of the present document, as shown in FIG. 27, includes the following steps:

Step 23a: the OSS/NMS receiving a notification or confirmation message, sent by an NFVO, for Terminate VNF;

Step 23b: the OSS/NMS acquiring a DN of a management information object instance corresponding to a VNF instance, and sending a request message for deletion of the management information object instance corresponding to the VNF instance to an EMS, herein a parameter carried in the request message includes the DN of the management information object instance corresponding to the VNF instance;

Step 23c: the EMS deleting the management information object instance corresponding to the VNF instance, and deleting a mapping relationship between the management information object instance and a VNF; and Step 23d: the EMS sending a confirmation message for deletion of the management information object instance to the OSS/NMS.

Embodiment 24

Figure 28:
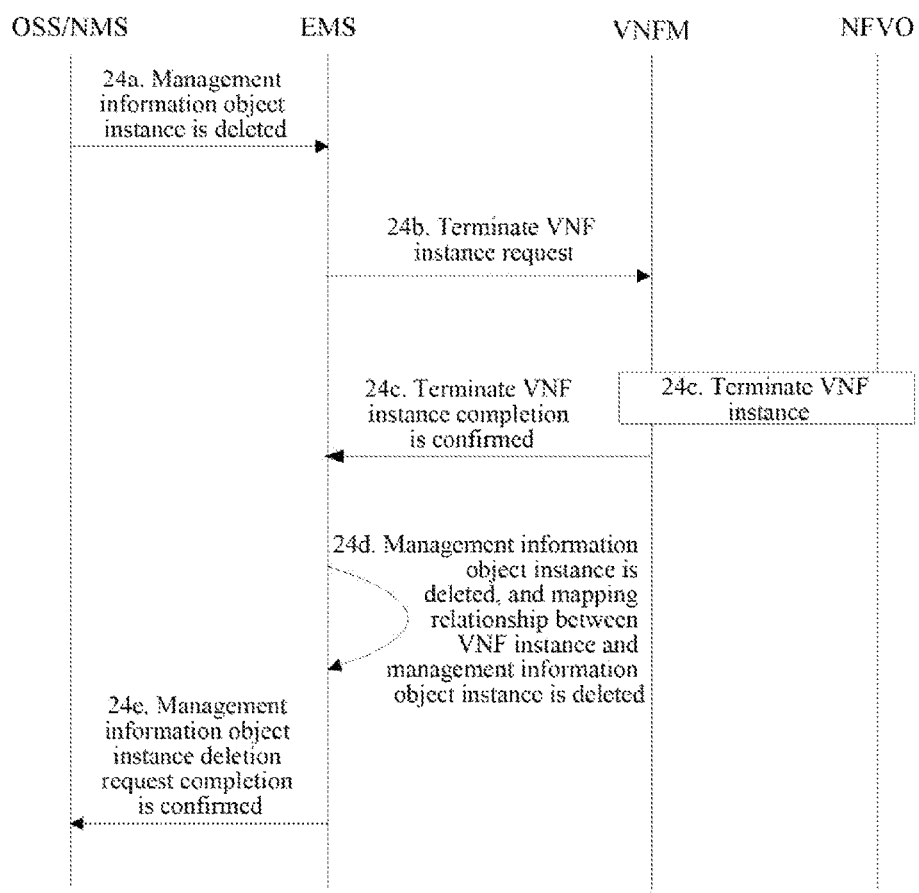
FIG. 28 is a detailed processing flowchart of a method for managing configuration information according to embodiment 24 of the present document.

An OSS/NMS triggers a process of deleting application layer configuration information to trigger Terminate VNF. A detailed processing flow of a method for managing configuration information according to embodiment 24 of the present document, as shown in FIG. 28, includes the following steps:

Step 24a: the OSS/NMS sends a request message for deletion of a management information object instance to an EMS;

herein a parameter carried in the request message includes a DN of the management information object instance and a Terminate VNF marker; and the request message instructs the EMS to send a Terminate VNF request message to a VNFM through the Terminate VNF marker;

Step 24b: the EMS receiving the request message, and sending the Terminate VNF request message to the VNFM according to the request message;

herein specifically, the EMS performs query of an IP address of the VNFM corresponding to a VNF instance according to the DN of the management information object instance, and sends the Terminate VNF request message to the VNFM according to the IP address of the VNFM, and herein a parameter carried in the request message includes an ID of the VNF instance;

Step 24c: the VNFM terminating the VNF instance after receiving the request message, and sending a confirmation message for Terminate VNF to the EMS;

Step 24d: the EMS receiving the confirmation message for Terminate VNF, deleting the management information object instance, and deleting a mapping relationship between the VNF instance and the management information object instance; and Step 24e: the EMS sending a confirmation message for deletion of the application management information object instance to the OSS/NMS.

Embodiment 25

Figure 29:
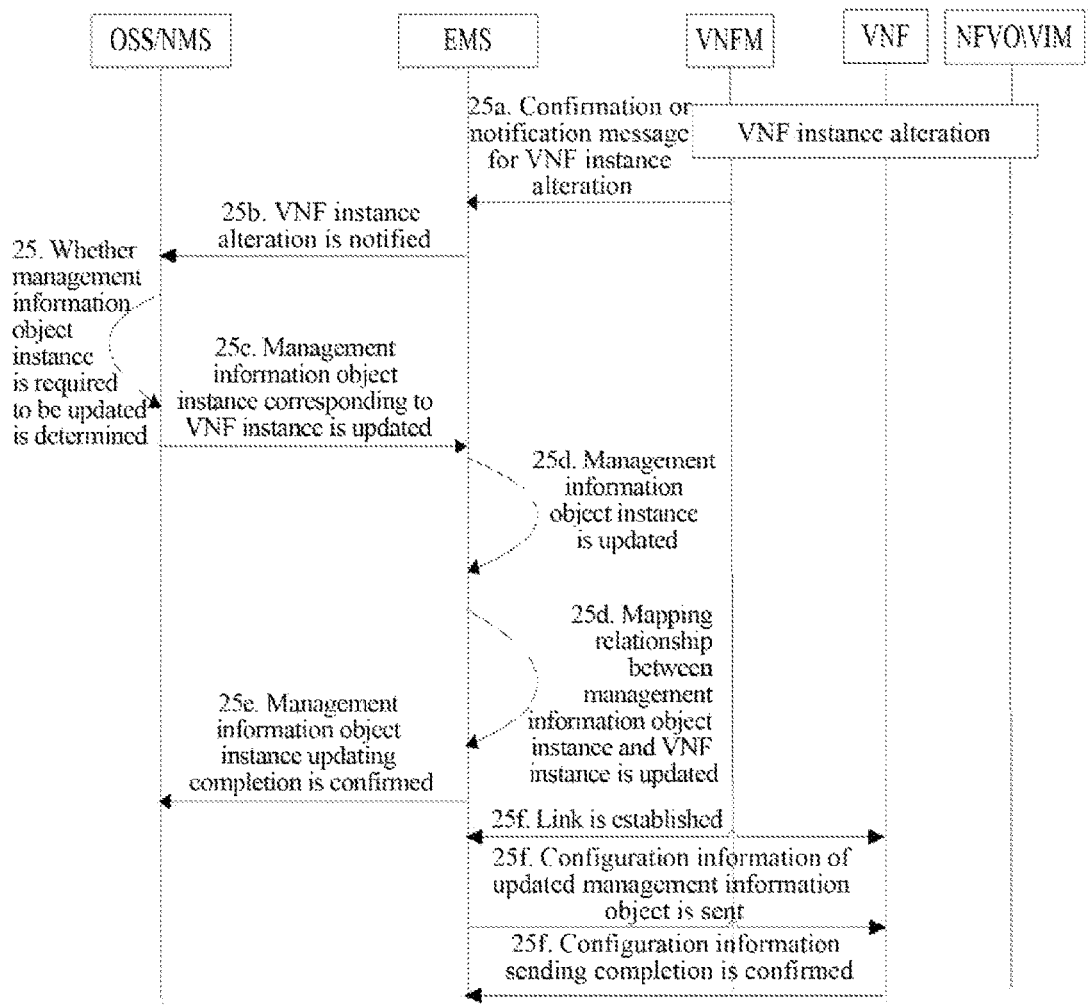
FIG. 29 is a detailed processing flowchart of a method for managing configuration information according to embodiment 25 of the present document.

After element functions are virtualized, besides Instantiate VNF and Terminate VNF, operations within a lifecycle of a VNF further include Scale VNF, Upgrade VNF, Modify VNF and the like, herein Scale VNF may further be subdivided into Scale in, Scale out, Scale up and Scale down. These operations will cause alterations in different aspects of a VNF instance and thus will cause an updating of application layer configuration information of the VNF instance, and are collectively referred to as VNF instance alteration operation in the present document. Therefore, the VNF instance alteration operation is required to be associated with updating of an information object instance to ensure accuracy and updating timeliness of the application layer configuration information of the VNF instance. After completion of the VNF instance alteration operation, a VNFM triggers updating of the application layer configuration information. A processing flow of a method for managing configuration information according to embodiment 25 of the present document, as shown in FIG. 29, includes the following steps:

Step 25a: an EMS receiving a notification or confirmation message, sent by the VNFM, for VNF instance alteration completion, herein a parameter carried in the message includes an ID of a VNF instance, a VNF instance alteration operation type, a parameter of VNF instance alteration and the like; and the VNF instance alteration operation type includes Scale out, Scale in, Scale up, Scale down, Update, Upgrade and Modify;

Step 25b: the EMS sending the notification message for VNF instance alteration completion to an OSS/NMS;

herein the parameter carried in the notification message includes the ID of the VNF instance and the VNF instance alteration operation type; and Step 25c: the OSS/NMS sending a request message for updating of a management information object instance corresponding to the VNF instance when determining that application layer configuration information of a VNF is required to be updated, herein a parameter carried in the request message includes a DN of the management information object instance, the ID of the VNF instance and the like; and herein here, factors for determining whether the management information object instance is required to be updated include information such as the VNF instance alteration operation type, whether Instantiate VNF is involved in the alteration operation and whether there is a new VNF instance ID and VNFD version;

Step 25d: the EMS receiving the request message, updating the management information object instance corresponding to the VNF instance according to the request message, and updating a mapping relationship between the management information object instance and the VNF instance;

Step 25e: the EMS sending a confirmation message for updating of the application management information object instance to the OSS/NMS; and Step 25f: the EMS establishing a link with the VNF instance according to the IP address used for managing access in the VNF instance, and sending new application layer configuration information to the VNF instance.

Embodiment 26

Figure 30:
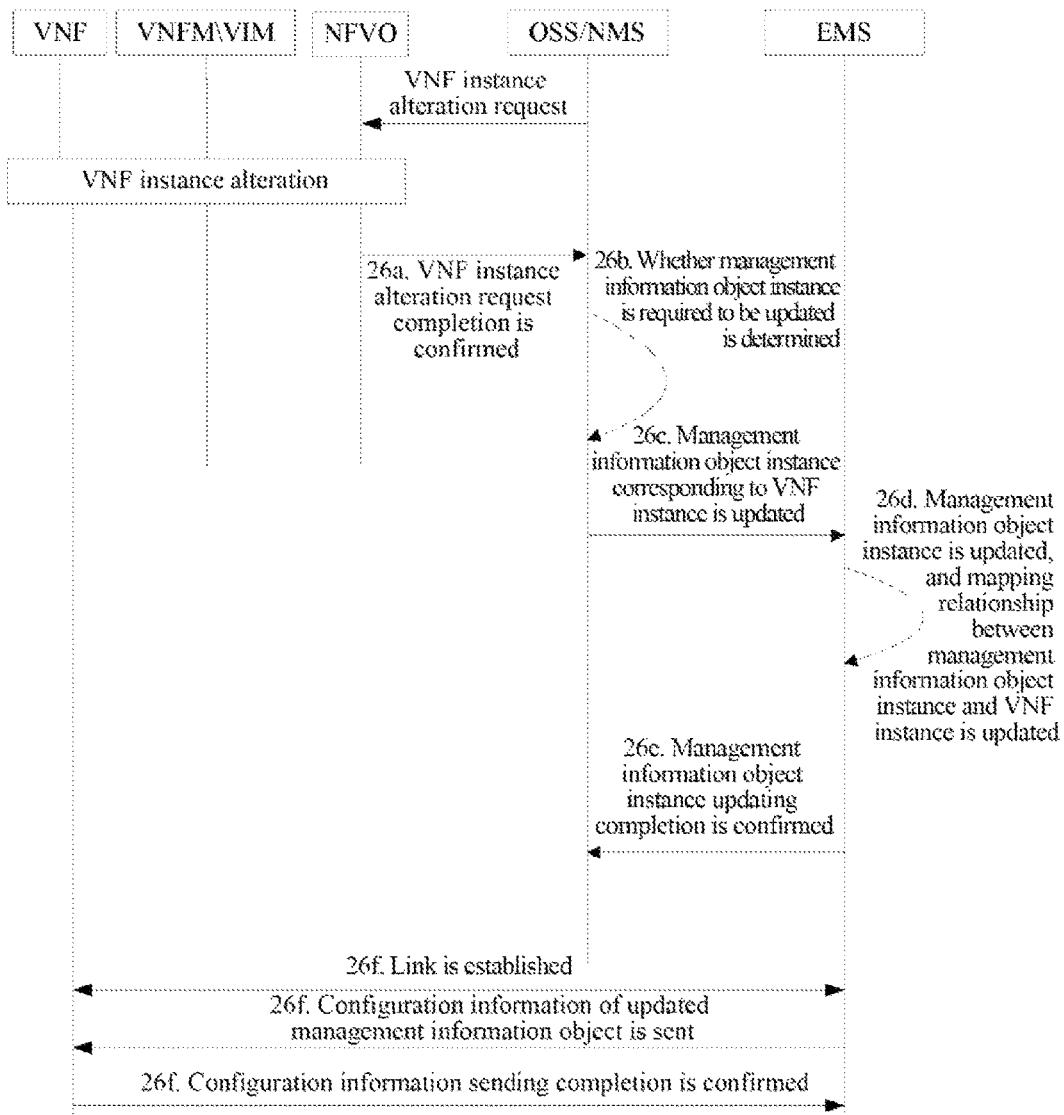
FIG. 30 is a detailed processing flowchart of a method for managing configuration information according to embodiment 26 of the present document.

After completion of a VNF instance alteration operation, an OSS/NMS is informed of VNF instance alteration, and triggers a process of updating application layer configuration information. A processing flow of a method for managing configuration information according to embodiment 26 of the present document, as shown in FIG. 30, includes the following steps:

Step 26a: the OSS/NMS receiving a confirmation message, sent by a VFNO, for VNF instance alteration completion, herein a parameter carried in the message includes an ID of a VNF instance, an VNF instance alteration operation type and the like; and the request message determines an alteration request message type through the VNF instance alteration operation type, the VNF instance alteration operation type including Scale out, Scale in, Scale up, Scale down, Update, Upgrade and Modify;

Step 26b: the OSS/NMS determining whether a management information object instance is required to be updated, herein factors for determining whether the management information object instance is required to be updated include information such as the VNF instance alteration operation type, whether Instantiate VNF is involved in an alteration operation and whether there is a new VNF instance ID and VNFD version;

Step 26c: the OSS/NMS sending a request message for updating of the management information object instance corresponding to the VNF instance to an EMS, herein a parameter carried in the request message includes a DN of the management information object instance, the ID of the VNF instance and the like;

Step 26d: the EMS receiving the request message, updating the management information object instance corresponding to the VNF instance according to the request message, and updating a mapping relationship between the management information object instance and the VNF instance;

Step 26e: sending a confirmation message for management information object instance updating completion to the OSS/NMS; and Step 26f: the EMS establishing a link with the VNF instance according to the IP address used for managing access in the VNF instance, and sending new application layer configuration information to the VNF instance.

Embodiment 27

Figure 31:
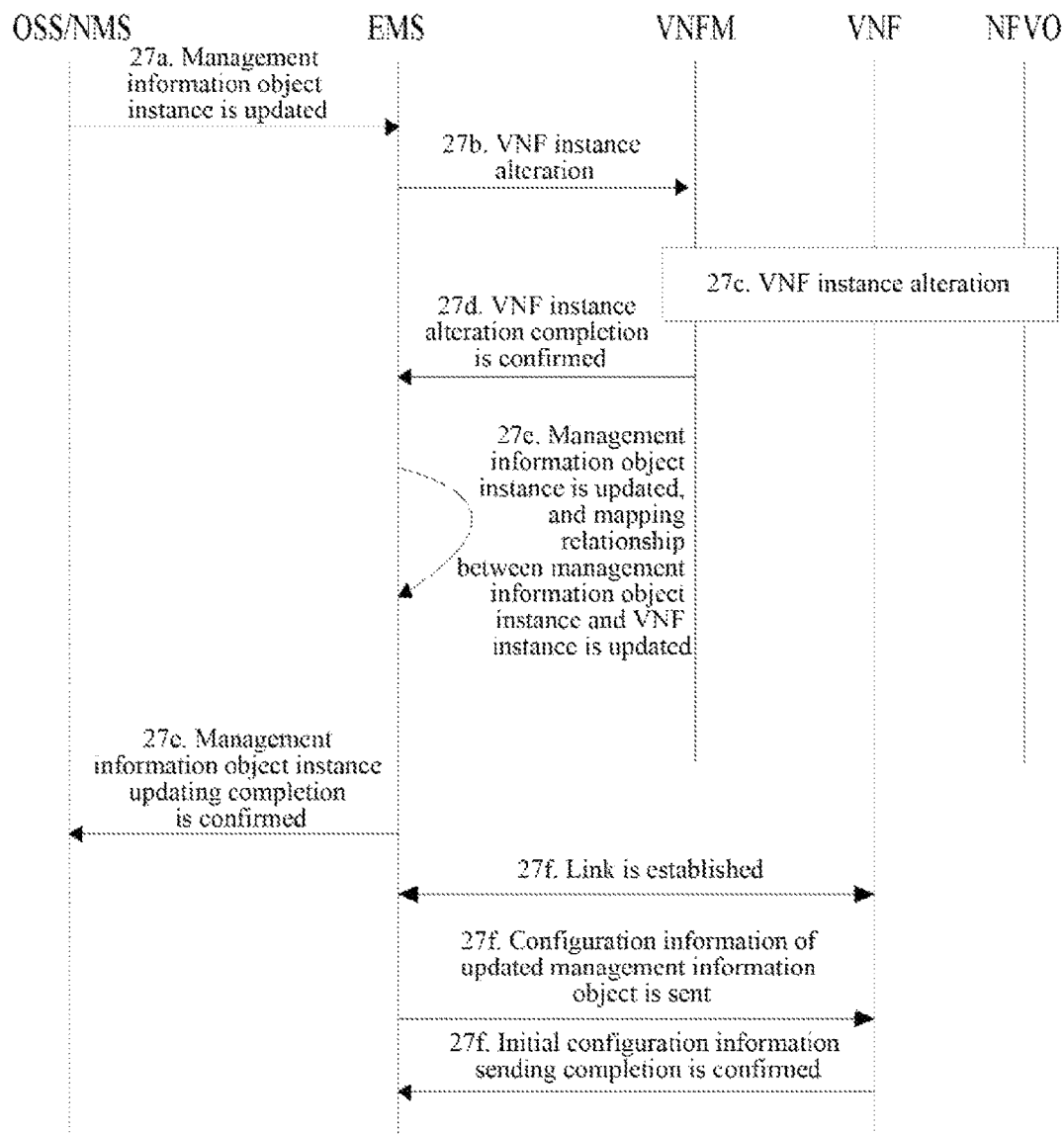
FIG. 31 is a detailed processing flowchart of a method for managing configuration information according to embodiment 27 of the present document.

An OSS/NMS triggers a process of updating application layer configuration information to trigger updating of a VNF instance. A processing flow of a method for managing configuration information according to embodiment 27 of the present document, as shown in FIG. 31, includes the following steps:

Step 27a: the OSS/NMS sending a request message for updating of a management information object instance to an EMS, herein a parameter carried in the request message includes a DN of the management information object instance, an ID of the VNF instance, a VNF instance alteration marker, a VNF instance alteration operation type and the like, and the request message instructs the EMS to send a VNF instance alteration request message to a VNFM through the VNF instance alteration marker and determine a alteration request message type through the VNF instance alteration operation type;

Step 27b: the EMS receiving the request message, and sending the VNF instance alteration request message to the VNFM, herein specifically, the EMS performs query of an IP address of the VNFM corresponding to the VNF instance according to the DN of the management information object instance, and sends the VNF instance alteration request message to the VNFM according to the IP address of the VNFM; and herein a parameter carried in the request message includes the DN of the management information object instance and the ID of the VNF instance;

Step 27c: the VNFM receiving the request message for VNF instance alteration completion, and sending a confirmation message for VNF instance alteration completion to the EMS;

Step 27d: the EMS receiving the confirmation message, sent by the VNFM, for VNF instance alteration completion;

Step 27e: the EMS updating the management information object instance, updating a mapping relationship between the management information object instance and the VNF instance, and sending a confirmation message for management information object instance updating completion to the OSS/NMS; and Step 27f: the EMS establishing a link with the VNF instance according to the IP address used for managing access in the VNF instance, and sending new application layer configuration information to the VNF instance.

Embodiment 28

Figure 32:
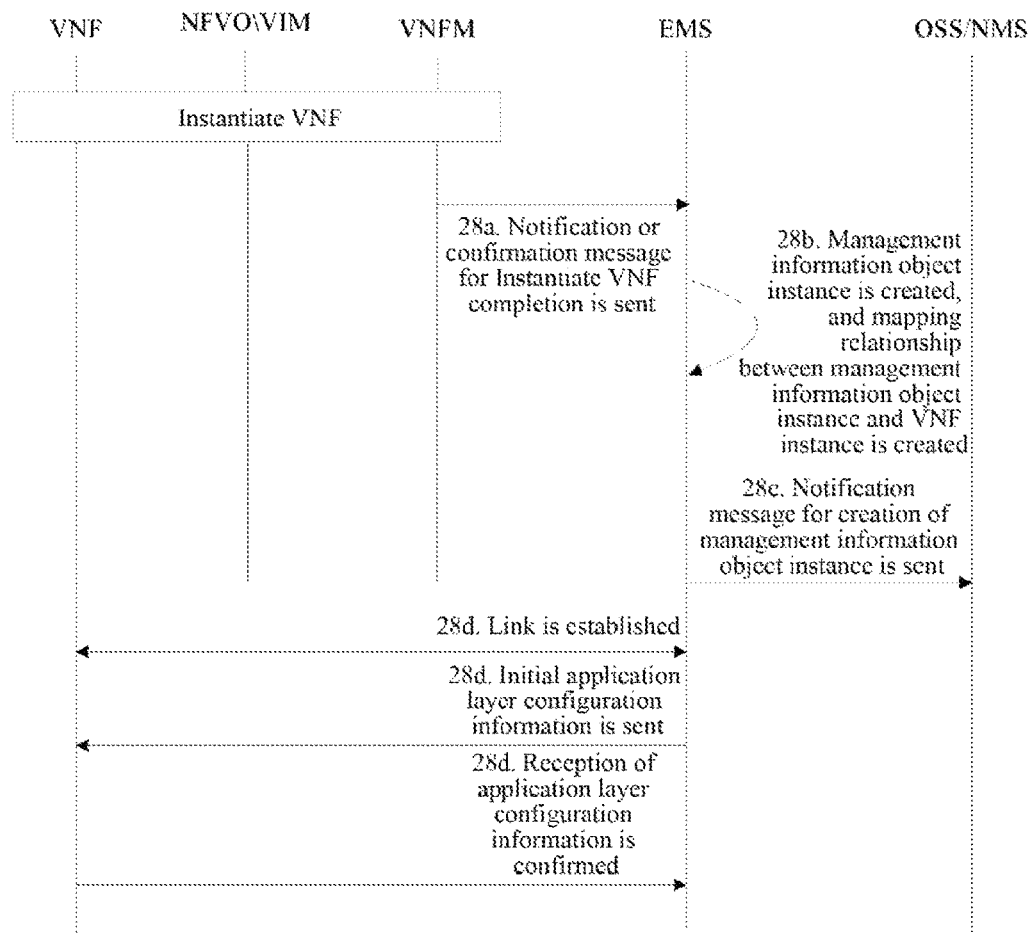
FIG. 32 is a detailed processing flowchart of a method for managing configuration information according to embodiment 28 of the present document.

A VNFM triggers an application layer initial configuration process of a VNF. A detailed processing flow of a method for managing configuration information according to embodiment 28 of the present document, as shown in FIG. 32, includes the following steps:

Step 28a: the VNFM sending a notification or confirmation message for Instantiate VNF completion to an EMS, herein a parameter carried in the message includes an ID of a VNF instance, a VNF instance type and an IP address of the VNF;

Step 28b: the EMS receiving the notification or confirmation message, sent by the VNFM, for Instantiate VNF completion, creating a management information object instance according to the message, and creating a mapping relationship between the management information object instance and the VNF instance;

Step 28c: the EMS sending a notification message for creation of the management information object instance to the OSS/NMS; and Step 28d: the EMS establishing a link with the VNF instance and sending initial application layer configuration information to the VNF instance, and the VNF instance sending a confirmation message of reception of the application layer configuration information to the EMS.

Embodiment 29

Figure 33:
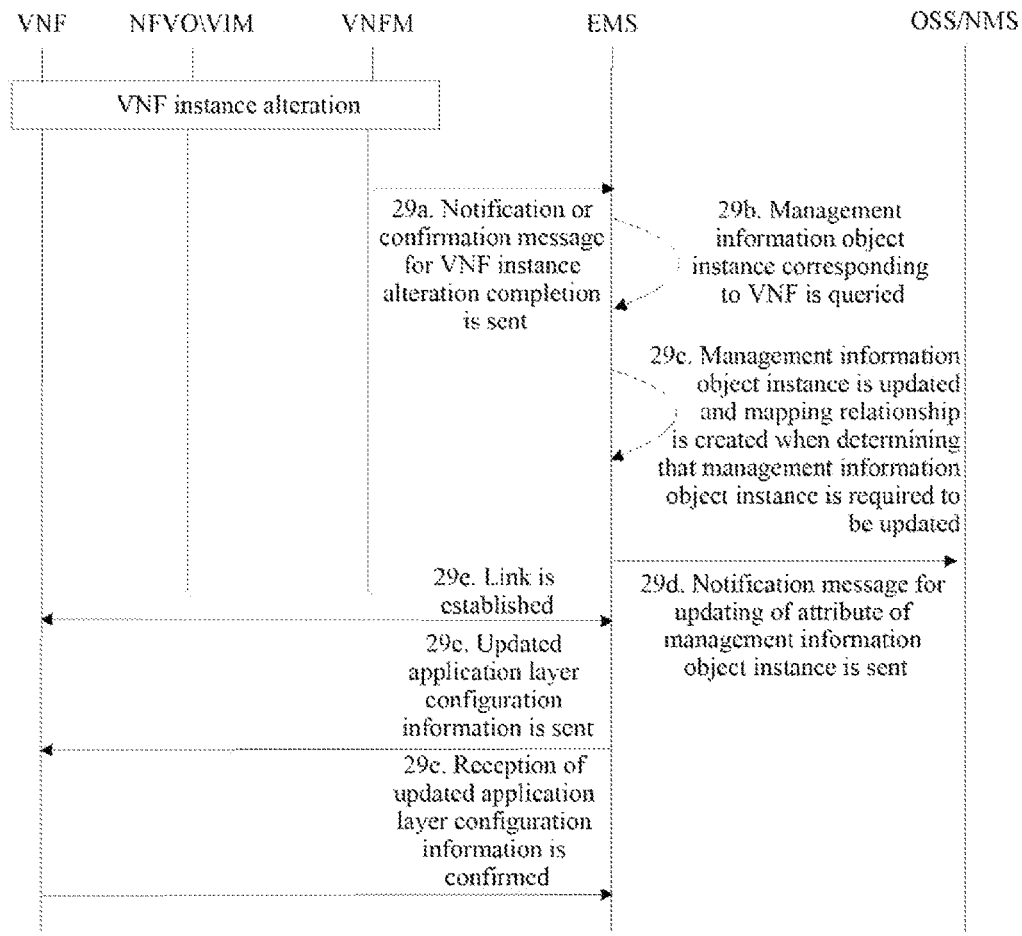
FIG. 33 is a detailed processing flowchart of a method for managing configuration information according to embodiment 29 of the present document.

A VNFM triggers updating of application layer configuration information. A processing flow of a method for managing configuration information according to embodiment 29 of the present document, as shown in FIG. 33, includes the following steps:

Step 29a: the VNFM sending a notification or confirmation message for VNF instance alteration completion to an EMS, herein a parameter carried in the message includes an ID of a VNF instance and a VNF instance alteration operation type;

Step 29b: the EMS receiving the notification or confirmation message, sent by the VNFM, for VNF instance alteration completion, and performing query of a management information object instance corresponding to the VNF instance according to the message;

Step 29c: the EMS updating the management information object instance corresponding to the VNF instance and updating a mapping relationship between the VNF instance and the management information object instance when determining that the management information object instance is required to be updated, herein factors for determining whether the management information object instance is required to be updated include information such as the VNF instance alteration operation type, whether Instantiate VNF is involved in an alteration operation and whether there is a new VNF instance ID and VNFD version;

Step 29d: the EMS sending a notification message for updating of an attribute of the management information object instance to the OSS/NMS;

Step 29e: the EMS establishing a link with the VNF instance and sending the updated initial application layer configuration information to the VNF instance, and the VNF instance sending a confirmation message of reception of the application layer configuration information to the EMS.

In the abovementioned embodiment 19 to embodiment 29 of the present document, the process of establishing a link between the EMS and the VNF may be initiated by the EMS, or may also be initiated by the VNF.

Figure 34:
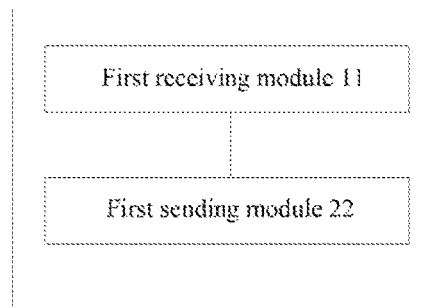
FIG. 34 is a structure diagram of a device for managing configuration information according to an embodiment of the present document.

In order to implement the abovementioned method for managing the configuration information, an embodiment of the present document further provides a device for managing configuration information, a structure of which, as shown in FIG. 34, includes a first receiving module 11 and a first sending module 12, herein the first receiving module 11 is arranged to receive a lifecycle operation completion message of a VNF; and the first sending module 12 is arranged to send a management information object instance operation request message corresponding to a lifecycle operation of the VNF to an EMS according to the lifecycle operation completion message of the VNF received by the first receiving module 11.

A parameter carried in the request message includes a DN of the management information object instance corresponding to a VNF instance.

Further, the message received by the first receiving module is a confirmation message, sent by an NFVO, for Instantiate VNF completion.

Correspondingly, the first sending module 11 sends a request message for creation of the management information object instance corresponding to the VNF instance.

In an embodiment, the message received by the first receiving module 11 is a notification message, sent by the EMS, for Instantiate VNF completion; and a parameter carried in the notification message includes an ID of the VNF instance and a VNF instance type.

Correspondingly, the first sending module 12 sends a request message for creation of the management information object instance corresponding to the VNF instance.

A parameter carried in the request message includes the DN of the management information object instance and the ID of the VNF instance.

In an embodiment, the message received by the first receiving module 11 is a confirmation message, sent by the NFVO, for Terminate VNF completion.

Correspondingly, the first sending module 12 sends a request message for deletion of the management information object instance corresponding to the VNF instance.

A parameter carried in the request message includes the DN of the management information object instance corresponding to the VNF instance.

In an embodiment, the message received by the first receiving module 11 is a confirmation message, sent by the NFVO, for VNF instance alteration; and the confirmation message includes the ID of the VNF instance, a VNF instance alteration operation type, a version of the VNF instance and a virtualized network function descriptor (VNFD) version.

Correspondingly, the first sending module 12 sends a request message for updating of the management information object instance corresponding to the NVF instance when determining that the management information object instance is required to be updated.

A parameter carried in the request message includes the DN of the management information object instance and the ID of the VNF instance.

In an embodiment, the message received by the first receiving module 11 is a notification message, sent by the EMS, for VNF instance alteration completion; and a parameter carried in the notification message includes the ID of the VNF instance and the VNF instance alteration operation type.

Correspondingly, the first sending module 12 sends a request message for updating of the management information object instance corresponding to the VNF instance when determining that the management information object instance is required to be updated.

The request message includes the DN of the management information object instance and the ID of the VNF instance.

It should be noted that the device for managing the configuration information may be implemented by an OSS or an NMS in the embodiment of the present document.

Figure 35:
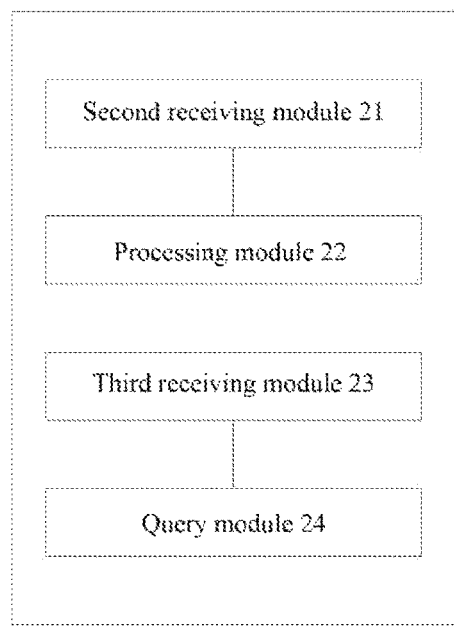
FIG. 35 is a structure diagram of an EMS according to an embodiment of the present document.

In order to implement the abovementioned method for managing the configuration information, an embodiment of the present document further provides an EMS, a structure diagram of which, as shown in FIG. 35, includes a second receiving module 21 and a processing module 22, herein the second receiving module 21 is arranged to receive a lifecycle operation completion message of a VNF or a management information object instance operation request message; and the processing module 22 is arranged to operate a management information object instance according to the message received by the second receiving module 21, and operate a mapping relationship between the management information object instance and a VNF instance.

An attribute of the mapping relationship between the management information object instance and the VNF instance includes a DN of the management information object instance and an ID of the VNF instance; and the attribute of the mapping relationship between the management information object instance and the VNF instance further includes one or more of the IP address of the VNF instance, an IP address of a VNFM which the VNF instance belongs to and a VNF instance type.

In an embodiment, the message received by the second receiving module 21 is a request message, sent by an OSS/NMS, for creation of the management information object instance corresponding to the VNF instance, the request message including the DN of the management information object instance and the ID of the VNF instance.

Figure 36:
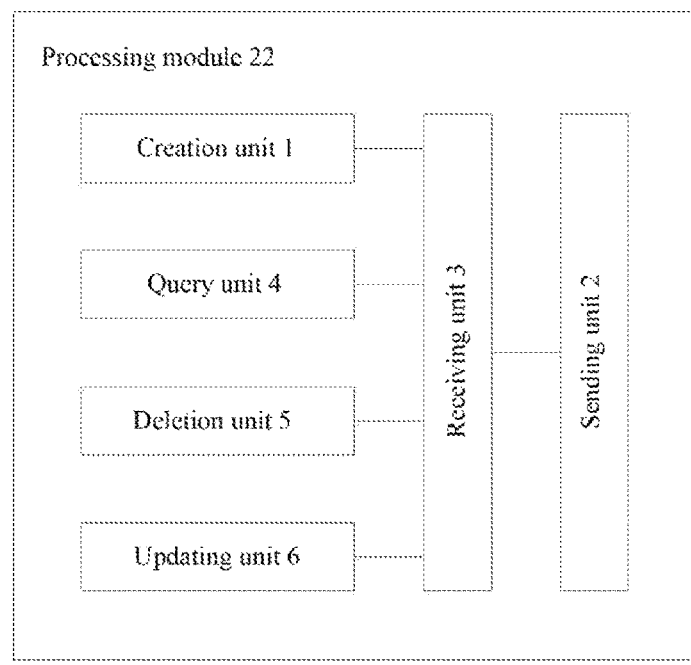
FIG. 36 is a structure diagram of a processing module according to an embodiment of the present document.

Correspondingly, a structure diagram of the processing module 22, as shown in FIG. 36, includes a creation unit 1 arranged to create the management information object instance and create the mapping relationship between the management information object instance and the VNF instance.

In an embodiment, the message received by the second receiving module 21 is a notification or confirmation message, sent by the VNFM, for Instantiate VNF completion.

Correspondingly, the processing module 22 further includes a sending unit 2 and a receiving module, herein the sending unit 2 is arranged to send the notification message for Instantiate VNF completion to the OSS/NMS, the notification message including the ID of the VNF instance and the type of the VNF instance; and the receiving unit 3 is arranged to receive the request message, sent by the OSS/NMS, for creation of the management information object instance corresponding to the VNF instance, a parameter carried in the request message including the DN of the management information object instance and the ID of the VNF instance.

The creation unit 1 is further arranged to create the management information object instance according to the request message, and create the mapping relationship between the management information object instance and the VNF instance.

In an embodiment, the message received by the second receiving message 21 is a request message, sent by the OSS/NMS, for creation of the management information object instance, the request message carrying a parameter indicating triggering of Instantiate VNF.

Correspondingly, the sending unit 2 is further arranged to send an Instantiate VNF request message to the VNFM according to the request message.

The receiving unit 3 is further arranged to receive a confirmation message, sent by the VNFM, for Instantiate VNF completion.

The creation unit 1 is further arranged to create the management information object instance, and create the mapping relationship between the management information object instance and the VNF instance.

In an embodiment, the message received by the second receiving module 21 is a notification or confirmation message, sent by the VNFM, for Instantiate VNF completion, a parameter carried in the message including the ID of the VNF instance, the VNF instance type and the IP address of the VNF.

Correspondingly, the creation unit 1 is further arranged to create the management information object instance corresponding to the VNF instance, and create the mapping relationship between the VNF instance and the management information object instance.

The sending unit 2 is further arranged to send a notification message for creation of the management information object instance to the OSS/NMS.

In an embodiment, the message received by the second receiving module 21 is a request message, sent by the OSS/NMS, for deletion of the management information object instance corresponding to the VNF instance, the request message including the DN of the management information object instance corresponding to the VNF instance.

Correspondingly, the processing module further includes a deletion unit 5, herein the deletion unit 5 is arranged to delete the management information object instance corresponding to the VNF instance, and delete the mapping relationship between the management information object instance and the VNF instance.

In an embodiment, the message received by the second receiving module 21 is a notification or confirmation message, sent by the VNFM, for Terminate VNF.

Correspondingly, the processing module further includes a query unit 4 arranged to perform query of the management information object instance of the VNF instance.

The deletion unit 5 is further arranged to delete the management information object instance, and delete the mapping relationship between the VNF instance and the management information object instance.

In an embodiment, the message received by the second receiving module 21 is the request message, sent by the OSS/NMS, for deletion of the management information object instance, the request message further carrying a parameter indicating triggering of Terminate VNF.

Correspondingly, the sending unit 2 is further arranged to send a Terminate VNF request message to the VNFM according to the request message, the request message including the ID of the VNF instance.

The receiving unit 3 is further arranged to receive a Terminate VNF confirmation message sent by the VNFM.

The deletion unit 5 is further arranged to delete the management information object instance corresponding to the VNF instance, and delete the mapping relationship between the VNF instance and the management information object instance.

In an embodiment, the message received by the second receiving module 21 is a request message, sent by the OSS/NMS, for updating of the management information object instance corresponding to the VNF instance, a parameter carried in the request message including the DN of the management information object instance.

Correspondingly, the processing module 22 further includes an updating unit 6 arranged to update the management information object instance according to the request message, and update the mapping relationship between the management information object instance and the VNF instance.

In an embodiment, the message received by the second receiving module 21 is a notification or confirmation message, sent by the VNFM, for VNF instance alteration completion.

Correspondingly, the sending unit 2 is further arranged to send the notification message for VNF instance alteration completion to the OSS/NMS, the notification message including the ID of the VNF instance and a VNF instance alteration operation type.

The receiving unit 3 is further arranged to receive the request message, sent by the OSS/NMS, for updating of the management information object instance corresponding to the VNF instance.

The updating unit 6 is further arranged to update the management information object instance corresponding to the VNF instance according to the request message, and update the mapping relationship between the management information object instance and the VNF instance.

In an embodiment, the message received by the second receiving module 21 is a request message, sent by the OSS/NMS, for updating of the management information object instance, the request message carrying parameters indicating triggering of VNF instance alteration and the VNF instance alteration operation type.

Correspondingly, the sending unit 2 is further arranged to send a VNF instance alteration request message to the VNFM according to the request message, the request message including the DN of the management information object instance.

The receiving unit 3 is further arranged to receive the confirmation message, sent by the VNFM, for VNF instance alteration completion.

The updating unit 6 is further arranged to update the management information object instance, and update the mapping relationship between the management information object instance and the VNF instance.

In an embodiment, the message received by the second receiving module 21 is a notification or confirmation message, sent by the VNFM, for VNF instance alteration completion, a parameter carried in the message including the ID of the VNF instance and the VNF instance alteration operation type.

Correspondingly, the query unit 4 is further arranged to perform query of the management information object instance corresponding to the VNF instance.

The updating unit 6 is further arranged to update the management information object instance corresponding to the VNF instance and update the mapping relationship between the VNF instance and the management information object instance when determining that the management information object instance is required to be updated.

The sending unit 2 is further arranged to send a notification message for updating of an attribute of the management information object instance to the OSS/NMS.

Further, the EMS further includes a third receiving module 23 and a query module 24.

The third receiving module 23 is arranged to receive a query request message sent by the OSS/NMS.

The query request message is to perform query of the VNF instance corresponding to the management information object instance, the query request message including the DN of the management information object instance; or the query request message is to perform query of the management information object instance corresponding to the VNF instance, the query request message including the ID of the VNF instance.

Correspondingly, the query module 24 is arranged to perform query according to the query request message.

Both the first receiving module 11 and first sending module 12 in the device for managing the configuration information provided in the embodiment of the present document may be implemented by a processor, and of course, may also be implemented by a specific logical circuit, herein the processor may be a processor on the OSS/NMS. In practical applications, the processor may be a CPU, a micro processing unit (MPU), a digital signal processor (DSP) or a field programmable gate array (FPGA), etc.

The second receiving module 21, processing module 22, third receiving module 23 and query module 24 in the EMS provided in the embodiment of the present document may all be implemented by a processor, and of course, may also be implemented by a specific logical circuit, herein the processor may be a processor on the OSS/NMS. In practical applications, the processor may be a CPU, an MPU, a DSP or an FPGA, etc.

In the embodiments of the present document, if the method for managing the configuration information described above is implemented in the form of a software function module and sold or used as an independent product, it may also be stored in a computer readable storage medium. Based on such understanding, the technical schemes of the embodiments of the present document or portions thereof making contributions to the prior art essentially may be embodied in the form of a computer software product, which is stored in a storage medium, including a plurality of instructions used to enable a computer device (which may be a personal computer, a server, a network device or the like) to execute all or part of the method in each embodiment of the present document. The abovementioned storage medium includes various media capable of storing program codes, such as a U disk, a mobile hard disk, a read only memory (ROM), a magnetic disk or a compact disc. Thus, the embodiment of the present document is not limited to any specific combination of hardware and software.

Correspondingly, an embodiment of the present document further provides a computer storage medium having stored computer executable instructions therein, which are used to execute the abovementioned methods for managing the configuration information according to the embodiments of the present document.

The above description is only preferred embodiments of the present document and is not intended to limit the protection scope of the present document.

I claim:

1. A method for managing configuration information, the method comprising:
   receiving, by an operation support system/network management system (OSS/NMS), a lifecycle operation completion message of a virtualized network function (VNF); and
   sending a management information object instance operation request message corresponding to a lifecycle operation of the VNF to an element management system (EMS) according to the received lifecycle operation completion message of the VNF.

2. The method for managing the configuration information according to claim 1, wherein a parameter carried in the request message comprises a distinguish name (DN) of the management information object instance corresponding to a VNF instance.

3. The method for managing the configuration information according to claim 1, wherein:
   when the lifecycle operation completion message of the VNF is a confirmation message, sent by a NFV orchestrator (NFVO), for Instantiate VNF completion, the management information object instance operation request message corresponding to the lifecycle operation of the VNF is a request message for creation of the management information object instance corresponding to the VNF instance;
   when the lifecycle operation completion message of the VNF is a notification message, sent by the EMS, for Instantiate VNF completion, a parameter carried in the notification message comprises an Identity (ID) of the VNF instance and a VNF instance type, and the management information object instance operation request message corresponding to the lifecycle operation of the VNF is a request message for creation of the management information object instance corresponding to the VNF instance;
   when the lifecycle operation completion message of the VNF is a confirmation message, sent by the NFVO, for Terminate VNF instance completion, the management information object instance operation request message corresponding to the lifecycle operation of the VNF is a request message for deletion of the management information object instance corresponding to the VNF instance;
   when the lifecycle operation completion message of the VNF is a confirmation message, sent by the NFVO, for VNF instance alteration completion, if it is determined that the management information object instance is required to be updated, the management information object instance operation request message corresponding to the lifestyle operation of the VNF is a request message for updating of the management information object instance corresponding to the VNF instance; and
   when the lifecycle operation completion message of the VNF is a notification message, sent by the EMS, for VNF instance alteration completion, a parameter carried in the notification message comprises the ID of the VNF instance and a VNF instance alteration operation type, and if it is determined that the management information object instance is required to be updated, the management information object instance operation request message corresponding to the lifecycle operation of the VNF is a request message for updating of the management information object instance corresponding to the VNF instance.

4. A method for managing configuration information, the method comprising:
   receiving, by an element management system (EMS), a lifecycle operation completion message of a virtualized network function (VNF) or a management information object instance operation request message; and
   operating a management information object instance according to the received message, and operating a mapping relationship between the management information object instance and a VNF instance.

5. The method for managing the configuration information according to claim 4, wherein an attribute of the mapping relationship between the management information object instance and the VNF instance comprises a distinguish name (DN) of the management information object instance corresponding to the VNF instance and an Identity (ID) of the VNF instance.

6. The method for managing the configuration information according to claim 4, wherein;
   when the management information object instance operation request message is a request message, sent by an operation support system/network management system (OSS/NMS), for creation of the management information object instance corresponding to the VNF instance, and a parameter carried in the request message comprises the DN of the management information object instance and the ID of the VNF instance, operating the management information object instance and operating the mapping relationship between the management information object instance and the VNF instance comprises: creating the management information object instance, and creating the mapping relationship between the management information object instance and the VNF instance;

when the management information object instance operation request message is the request message, sent by the OSS/NMS, for creation of the management information object instance, and the request message carries a parameter indicating triggering of Instantiate VNF, operating the management information object instance and operating the mapping relationship between the management information object instance and the VNF instance comprises:
  sending an Instantiate VNF request message to the VNFM according to the request message,
  receiving the confirmation message, sent by the VNFM, for Instantiate VNF completion; and
  creating the management information object instance, and creating the mapping relationship between the management information object instance and the VNF instance;

when the management information object instance operation request message is the notification or confirmation message, sent by the VNFM, for Instantiate VNF completion, operating the management information object instance and operating the mapping relationship between the management information object instance and the VNF instance comprises:
  creating the management information object instance corresponding to the VNF instance, and creating the mapping relationship between the management information object instance and the VNF instance; and
  sending a notification message for creation of the management information object instance to the OSS/NMS;

when the management information object Instance operation request message is a request message, sent by the OSS/NMS, for deletion of the management information object instance corresponding to the VNF instance, and the parameter carried in the request message comprises the DN of the management information object instance corresponding to the VNF instance, operating the management information object instance and operating the mapping relationship between the management information object instance and the VNF instance comprises: deleting the management information object instance corresponding to the VNF instance, and deleting the mapping relationship between the management information object instance and the VNF instance;

when the management information object, instance operation request message is a request message, sent by the OSS/NMS, for deletion of the management information object instance, and the request message carries a parameter indicating triggering of Terminate VNF, operating the management information object instance and operating the mapping relationship between the management information object instance and the VNF instance comprises:
  sending a Terminate VNF request message to the VNFM according to the request message;
  receiving a Terminate VNF confirmation message sent by the VNFM; and
  deleting the management information object instance corresponding to the VNF instance, and deleting the mapping relationship between the VNF instance and the management information object instance, message, sent by the OSS/NMS, for updating of the management information object instance corresponding to the VNF instance, and a parameter carried in the request message comprises the DN of the management information object instance corresponding to the VNF instance, operating the management information object instance and operating the mapping relationship between the management information object instance and the VNF instance comprises: updating the management information object instance according to the request message, and updating the mapping relationship between the management information object instance and the VNF instance;

when the management information object instance operation request message is a request message, sent by the OSS/NMS, for updating of the management information object instance, and the request message carries parameters indicating triggering of VNF instance alteration and the VNF instance alteration operation type, operating the management information object instance and operating the mapping relationship between the management information object instance and the VNF instance comprises:
  sending a VNF instance alteration request message to the VNFM according to the request message;
  receiving a confirmation message, sent by the VNFM, for VNF instance alteration completion; and
  updating the management information object instance, and updating the mapping relationship between the management information object instance and the VNF instance;

when the management information object instance operation request message is a notification or confirmation message, sent by the VNFM, for VNF instance alteration completion, operating the management information object instance and operating the mapping relationship between the management information object instance and the VNF instance comprises:
  performing query of the management information object instance corresponding to the VNF instance;
  updating the management information object instance and updating the mapping relationship between the management information object instance and the VNF instance when determining that the management information object instance is required to be updated; and
  sending a notification message for updating of an attribute of the management information object instance to the OSS/NMS.

7. The method for managing the configuration information according to claim 4, wherein:
  when the lifecycle operation completion message of the VNF is a notification or confirmation message, sent by a VNF Manager (VNFM), for Instantiate VNF completion, operating the management information object instance and operating the mapping relationship between the management information object instance and the VNF instance comprises:
    sending the notification message for Instantiate VNF completion to the OSS/NMS, a parameter carried in the notification message comprising the ID of the VNF instance and a type of the VNF instance;
    receiving the request message, sent by the OSS/NMS, for creation of the management information object instance corresponding to the VNF instance; and creating the management information object instance according to the request message, and creating the mapping relationship between the management information object instance and the VNF instance;

when the lifecycle operation completion message of the VNF is a notification or confirmation message, sent by the VNFM, for Terminate VNF completion, operating the management information object instance and operating the mapping relationship between the management information object instance and the VNF instance comprises:

performing query of the management information object instance corresponding to the VNF instance;

deleting the management information object instance, and deleting the mapping relationship between the VNF instance and the management information object instance; and sending a notification message for deletion of the management information object instance to the OSS/NMS;

when the lifecycle operation completion message of the VNF is a notification or confirmation message, sent by the VNFM, for VNF instance alteration completion, operating the management information object instance and operating the mapping relationship between the management information object instance and the VNF instance comprises:

sending the notification message for VNF instance alteration completion to the OSS/NMS, a parameter carried in the notification message comprising the ID of the VNF instance and the VNF instance alteration operation type;

receiving a request message, sent by the OSS/NMS, for updating of the management information object instance corresponding to the VNF instance; and updating the management information object instance corresponding to the VNF instance according to the request message, and updating the mapping relationship between the management information object instance and the VNF instance.

8. The method for managing the configuration information according to claim 4, wherein the method further comprises:

the EMS receiving a query request message sent by the OSS/NMS, wherein the query request message is to perform query of the VNF instance corresponding to the management information object instance, and a parameter carried in the query request message comprises the DN of the management information object instance; or the query request message is to perform query of the management information object instance corresponding to the VNF instance, and the parameter carried in the query request message comprises the ID of the VNF instance; and the EMS performing query according to the received query request message.

9. A device for managing configuration information, comprising a first receiving hardware module and a first sending hardware module, wherein the first receiving hardware module is arranged to receive a lifecycle operation completion message of a virtualized network function (VNF); and the first sending hardware module is arranged to send a management information object instance operation request message corresponding to a lifecycle operation of the VNF to an element management system (EMS) according to the received lifecycle operation completion message of the VNF.

10. The device for managing the configuration information according to claim 9, wherein a parameter carried in the request message comprises a distinguish name (DN) of the management information object instance corresponding to a VNF instance.

11. The device for managing the configuration information according to claim 9, wherein the message received by the first receiving hardware module is a confirmation message, sent by a NFV Orchestrator (NFVO), for Instantiate VNF completion; and correspondingly, the first sending hardware module sends a request message for creation of the management information object instance corresponding to the VNF instance.

12. The device for managing the configuration information according to claim 9, wherein:

the message received by the first receiving hardware module is a notification message, sent by the EMS, for Instantiate VNF completion; and a parameter carried in the notification message comprises an Identity (ID) of the VNF instance and a VNF instance type; and correspondingly, the first sending hardware module sends a request message for creation of the management information object instance corresponding to the VNF instance;

or, the message received by the first receiving hardware module is a confirmation message, sent by the NFVO, for Terminate VNF, and correspondingly, the first sending hardware module sends a request message for deletion of the management information object instance corresponding to the VNF instance;

or, the message received by the first receiving hardware module is a confirmation message, sent by the NFVO, for VNF alteration completion, and correspondingly, the first sending hardware module sends a request message for updating of the management information object instance corresponding to the VNF instance when determining that the management information object instance is required to be updated;

or, the message received by the first receiving hardware module is a notification message, sent by the EMS, for VNF instance alteration completion, and a parameter carried in the notification message comprises the ID of the VNF instance and a VNF instance alteration operation type; and correspondingly, the first sending hardware module sends a request message for updating of the management information object instance corresponding to the VNF instance when determining that the management information object instance is required to be updated.

13. An element management system (EMS), comprising a second receiving hardware module and a processing hardware module, wherein the second receiving hardware module is arranged to receive a lifecycle operation completion message of a virtualized network function (VNF) or a management information object instance operation request message; and the processing hardware module is arranged to operate a management information object instance according to the message received by the second receiving hardware module, and operate a mapping relationship between the management information object instance and a VNF instance.

14. The EMS according to claim 13, wherein an attribute of the mapping relationship between the management information object instance and the VNF instance comprises a distinguish name (DN) of the management information object instance corresponding to the VNF instance and an Identity (ID) of the VNF instance.

15. The EMS according to claim 13, wherein
the message received by the second receiving hardware module is a request message, sent by an operation support system/network management system (OSS/NMS), for creation of the management information object instance corresponding to the VNF instance; and a parameter carried in the request message comprises the DN of the management information object instance and the ID of the VNF instance; and correspondingly, the processing hardware module further comprises a creation unit arranged to create the management information object instance, and create the mapping relationship between the management information object instance and the VNF instance;

or, the message received by the second receiving hardware module is a notification or confirmation message, sent by a VNF Manager (VNFM), for Instantiate VNF completion; and correspondingly, the processing hardware module further comprises a first sending unit and a first receiving unit, wherein the first sending unit is arranged to send the notification message for Instantiate VNF completion to the OSS/NMS, a parameter carried in the notification message including the ID of the VNF instance and a VNF instance type; the first receiving unit is arranged to receive the request message, sent by the OSS/NMS, for creation of the management information object instance corresponding to the VNF instance; and the creation unit is further arranged to create the management information object instance according to the request message, and create the mapping relationship between the management information object instance and the VNF instance;

or, the message received by the second receiving hardware module is the request message, sent by the OSS/NMS, for creation of the management information object instance, the request message carries a parameter indicating triggering of Instantiate VNF; correspondingly, the first sending unit is further arranged to send an Instantiate VNF request message to the VNFM according to the request message; the first receiving unit is further arranged to receive the confirmation message, sent by the VNFM, for Instantiate VNF completion; and the creation unit is further arranged to create the management information object instance, and create the mapping relationship between the management information object instance and the VNF instance;

or, the message received by the second receiving hardware module is the notification or confirmation message, sent by the VNFM, for Instantiate VNF completion; correspondingly, the creation unit is further arranged to create the management information object instance corresponding to the VNF instance, and create the mapping relationship between the management information object instance and the VNF instance; and the first sending unit is further arranged to send a notification message for creation of the management information object instance to the OSS/NMS;

or, the message received by the second receiving hardware module is a request message, sent by the OSS/NMS, for deletion of the management information object instance corresponding to the VNF instance; and the parameter carried in the request message comprises the DN of the management information object instance corresponding to the VNF instance; and correspondingly, the processing hardware module further comprises a deletion unit, wherein the deletion unit is arranged to delete the management information object instance corresponding to the VNF instance, and delete the mapping relationship between the management information object instance and the VNF instance;

or, the message received by the second receiving hardware module is a notification or confirmation message, sent by the VNFM, for Terminate VNF completion; correspondingly, the processing hardware module further comprises a query unit arranged to perform query of the management information object instance corresponding to the VNF instance; the deletion unit is further arranged to delete the management information object instance, and delete the mapping relationship between the VNF instance and the management information object instance; and the first sending unit is further arranged to send a notification message for deletion of the management information object instance to the OSS/NMS;

or, the message received by the second receiving hardware module is a request message, sent by the OSS/NMS, for deletion of the management information object instance; and the request message carries a parameter indicates triggering of Terminate VNF; correspondingly, the first sending unit is further arranged to send a Terminate VNF request message to the VNFM according to the request message; the first receiving unit is further arranged to receive a Terminate VNF confirmation message sent by the VNFM; and the deletion unit is further arranged to delete the management information object instance corresponding to the VNF instance, and delete the mapping relationship between the VNF instance and the management information object instance;

or, the message received by the second receiving hardware module is a request message, sent by the OSS/NMS, for updating of the management information object instance corresponding to the VNF instance; and a parameter carried in the request message comprises the DN of the management information object instance corresponding to the VNF instance; and correspondingly, the processing hardware module further comprises an updating unit arranged to update the management information object instance according to the request message, and update the mapping relationship between the management information object instance and the VNF instance;

or, the message received by the second receiving hardware module is a notification or confirmation message, sent by the VNFM, for VNF instance alteration completion; correspondingly, the first sending unit is further arranged to send the notification message for VNF instance alteration completion to the OSS/NMS, a parameter carried in the notification message including the ID of the VNF instance and the VNF instance alteration operation type; the first receiving unit is further arranged to receive a request message, sent by the OSS/NMS, for updating of the management information object instance corresponding to the VNF instance; and the updating unit is further arranged to update the management information object instance corresponding to the VNF instance according to the request message, and update the mapping relationship between the management information object instance and the VNF instance.

16. The EMS according to claim 13, wherein the message received by the second receiving hardware module is a request message, sent by the OSS/NMS, for updating of the management information object instance; and the request message carries parameters indicates triggering of VNF instance alteration and the VNF instance alteration operation type;
- correspondingly, the first sending unit is further arranged to send a VNF instance alteration request message to the VNFM according to the request message, the request message including the DN of the management information object instance;
- the first receiving unit is further arranged to receive a confirmation message, sent by the VNFM, for VNF instance alteration completion; and
- the updating unit is further arranged to update the management information object instance, and update the mapping relationship between the management information object instance and the VNF instance.

17. The EMS according to claim 13, wherein the message received by the second receiving hardware module is a notification or confirmation message, sent by the VNFM, for VNF instance alteration completion;
- correspondingly, the query unit is further arranged to perform query of the management information object instance corresponding to the VNF instance;
- the updating unit is further arranged to update the management information object instance and update the mapping relationship between the management information object instance and the VNF instance when determining that the management information object instance is required to be updated; and
- the first sending unit is further arranged to send a notification message for updating of an attribute of the management information object instance to the OSS/NMS.

18. The EMS according to claim 13, wherein the EMS further comprises a third receiving hardware module and a query hardware module, wherein
- the third receiving hardware module is arranged to receive a query request message sent by the OSS/NMS,
- wherein the query request message is to perform query of the VNF instance corresponding to the management information object instance, and a parameter carried in the query request message comprises the DN of the management information object instance; or the query request message is to perform query of the management information object instance corresponding to the VNF instance, and the parameter carried in the query request message comprises the ID of the VNF instance; and
- correspondingly, the query hardware module is arranged to implement query according to the received query request message.

19. A non-transitory computer storage medium, in which computer executable instructions are stored, wherein the computer executable instructions are used to execute the method for managing the configuration information according to claim 1.

20. A non-transitory computer storage medium, in which computer executable instructions are stored, wherein the computer executable instructions are used to execute the method for managing the configuration information according to claim 4.

* * * * *